(12) United States Patent
Nakamura et al.

(10) Patent No.: US 9,182,101 B2
(45) Date of Patent: Nov. 10, 2015

(54) LIGHT FLUX CONTROLLING MEMBER AND ILLUMINATING DEVICE

(71) Applicant: ENPLAS CORPORATION, Kawaguchi-shi, Saitama (JP)

(72) Inventors: Masato Nakamura, Kawaguchi (JP); Noriyuki Kawahara, Kawaguchi (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 13/708,067

(22) Filed: Dec. 7, 2012

(65) Prior Publication Data

US 2013/0176741 A1    Jul. 11, 2013

Related U.S. Application Data

(60) Provisional application No. 61/604,656, filed on Feb. 29, 2012.

(30) Foreign Application Priority Data

Dec. 9, 2011   (JP) .................................. 2011-270159
Feb. 24, 2012  (JP) .................................. 2012-038729

(51) Int. Cl.
*F21V 7/04*   (2006.01)
*F21V 5/04*   (2006.01)
(Continued)

(52) U.S. Cl.
CPC ..... *F21V 7/04* (2013.01); *F21V 5/04* (2013.01); *F21V 7/0008* (2013.01);
(Continued)

(58) Field of Classification Search
CPC ....... F21V 7/0008; F21V 7/0091; F21V 7/04; F21V 7/0033; F21V 7/22; F21V 5/04; F21V 5/045; F21V 3/049; F21V 13/12; F21V 29/2231; F21V 5/046; G02B 19/0071; G02B 19/0018; G02B 19/28
USPC ................... 362/347, 327, 329, 336, 311.02, 362/308–310, 32
See application file for complete search history.

(56) References Cited

U.S. PATENT DOCUMENTS 5,134,550 A * 7/1992 Young ........................... 362/560
6,350,041 B1  2/2002 Tarsa et al.
(Continued)

FOREIGN PATENT DOCUMENTS

JP   2003-258319 A    9/2003
JP   2007-042938 A    2/2007
(Continued)

OTHER PUBLICATIONS

International Search Report of PCT Application No. PCT/JP2012/007433 dated Feb. 5, 2013.
(Continued)

*Primary Examiner* — Elmito Breval
*Assistant Examiner* — Arman B Fallahkhair
(74) *Attorney, Agent, or Firm* — Brundidge & Stanger, P.C.

(57) ABSTRACT

Light flux controlling member 140 includes first light flux controlling member 141 and second light flux controlling member 142. First light flux controlling member 141 includes incidence surface 143 on which a part of light emitted from light-emitting element 130 is incident, total reflection surface 144 that reflects a part of light incident on incidence surface 143 toward second light flux controlling member 142, and emission surface 145 that emits a part of light incident on incidence surface 143 and light reflected by total reflection surface 144. Second light flux controlling member 142 includes reflection surface 149 that reflects a part of light emitted from first light flux controlling member 141. Reflection surface 149 is a rotational symmetric surface with the optical axis LA of light-emitting element 130 as a rotation axis.

8 Claims, 28 Drawing Sheets

(51) Int. Cl.
  *F21V 7/00* (2006.01)
  *F21V 13/12* (2006.01)
  *F21V 7/22* (2006.01)
  *G02B 19/00* (2006.01)
  *F21Y 101/02* (2006.01)
  *F21V 3/04* (2006.01)
  *F21Y 105/00* (2006.01)
  *F21K 99/00* (2010.01)

(52) U.S. Cl.
  CPC .............. *F21V 7/0091* (2013.01); *F21V 13/12* (2013.01); *F21K 9/50* (2013.01); *F21V 3/049* (2013.01); *F21V 5/045* (2013.01); *F21V 7/0033* (2013.01); *F21V 7/22* (2013.01); *F21Y 2101/02* (2013.01); *F21Y 2105/001* (2013.01); *G02B 19/0028* (2013.01)

(56) References Cited

U.S. PATENT DOCUMENTS

| | | | |
|---|---|---|---|
| 6,719,442 B1 | 4/2004 | Chen | |
| 6,758,582 B1 * | 7/2004 | Hsiao et al. | 362/302 |
| 7,153,002 B2 * | 12/2006 | Kim et al. | 362/327 |
| 7,425,084 B2 * | 9/2008 | Ruud et al. | 362/298 |
| 7,515,229 B2 * | 4/2009 | Chang | 349/114 |
| 7,753,561 B2 * | 7/2010 | Chaves et al. | 362/308 |
| 7,988,337 B2 * | 8/2011 | Huang | 362/299 |
| 8,292,466 B2 * | 10/2012 | Huang | 362/309 |
| 8,602,621 B2 * | 12/2013 | Li et al. | 362/555 |
| 8,628,220 B2 * | 1/2014 | Boonekamp et al. | 362/305 |
| 2006/0083003 A1 | 4/2006 | Kim et al. | |
| 2008/0073663 A1 | 3/2008 | Chang | |
| 2008/0080192 A1 | 4/2008 | Ruud et al. | |
| 2010/0110695 A1 | 5/2010 | Nakamura | |
| 2010/0208488 A1 | 8/2010 | Luo | |
| 2011/0286221 A1 | 11/2011 | Saito | |
| 2013/0114254 A1 * | 5/2013 | Nakamura | 362/235 |
| 2013/0286657 A1 * | 10/2013 | Chen et al. | 362/308 |
| 2014/0063816 A1 * | 3/2014 | Seki et al. | 362/309 |
| 2014/0177231 A1 * | 6/2014 | Nakamura | 362/308 |
| 2014/0204606 A1 * | 7/2014 | Smits et al. | 362/558 |
| 2015/0009679 A1 * | 1/2015 | Seki et al. | 362/307 |

FOREIGN PATENT DOCUMENTS

| | | |
|---|---|---|
| JP | 2007-048883 A | 2/2007 |
| JP | 2010-107844 A | 5/2010 |
| JP | 2011-023299 A | 2/2011 |
| JP | 2012-094320 A | 5/2012 |
| WO | 2010/144572 A2 | 12/2010 |

OTHER PUBLICATIONS

Extended European Search Report for EP 12855348.4 dated Jun. 23, 2015.

* cited by examiner

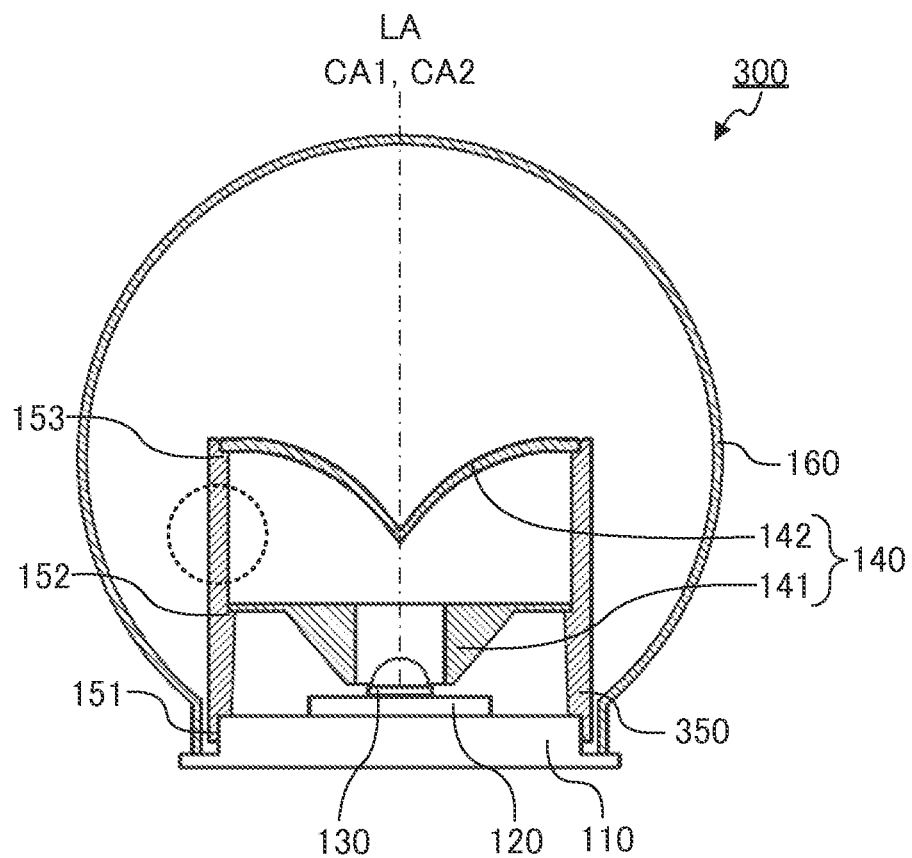
FIG. 13A
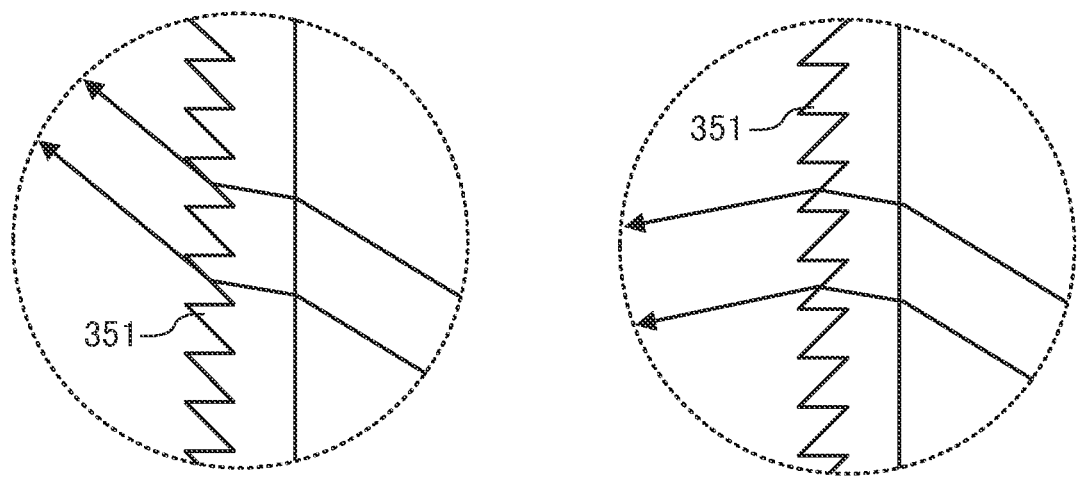
FIG. 13B
FIG. 13C

LIGHT FLUX CONTROLLING MEMBER AND ILLUMINATING DEVICE

CROSS REFERENCE TO RELATED APPLICATIONS

This application is entitled and claims the benefit of Japanese Patent Application No. 2011-270159, filed on Dec. 9, 2011, Japanese Patent Application No. 2012-038729, filed on Feb. 24, 2012, and U.S. Provisional Patent Application No. 61/604,656, filed on Feb. 29, 2012, the disclosure of which including the specification, drawings and abstract is incorporated herein by reference in its entirety.

TECHNICAL FIELD

The present invention relates to a light flux controlling member that controls distribution of light emitted from a light-emitting element and an illuminating apparatus including the light flux controlling member.

BACKGROUND ART

Recently, from the viewpoint of energy saving or environmental conservation, illuminating apparatuses (such as LED lamps) using a light-emitting diode (hereinafter, also referred to as "LED") as a light source have been used instead of incandescent lamps. However, a conventional illuminating apparatus using an LED as a light source can emit light only in the forward direction, but cannot emit light in all directions like an incandescent lamp. Accordingly, the conventional illuminating apparatus cannot extensively illuminate a room using reflected light from a ceiling or walls like an incandescent lamp.

In order to make light distribution characteristics of such a conventional illuminating apparatus using an LED as a light source close to the light distribution characteristics of an incandescent lamp, it has been proposed that the distribution of light emitted from the LED be controlled by the use of a light flux controlling member (for example, see PTL 1). FIG. 1 is a schematic diagram illustrating the configuration of an illuminating apparatus described in PTL 1. As shown in FIG. 1, illuminating apparatus 10 includes plural LEDs 12 arranged on a substrate and cylindrical case 14 formed of a light-transmitting material and disposed around LEDs 12. The top surface of case 14 is formed in an inverted truncated cone shape. Aluminum plate 16 reflecting light is attached to the oblique surface of the truncated cone, which serves as a reflection surface. On the other hand, the horizontal plane of the truncated cone serves as transmission window 18 transmitting light. As indicated by arrows in FIG. 1, a part of light emitted from LEDs 12 passes through transmission window 18 and serves as emitted light in the forward direction (upward direction). A part of light emitted from LEDs 12 is reflected by aluminum plate 16 and serves as emitted light in the lateral direction (horizontal direction) and in the backward direction (downward direction).

In this way, by controlling the traveling direction of light emitted from the LEDs using a light flux controlling member, it is possible to obtain emitted light in the lateral direction and in the backward direction as well as in the forward direction. Therefore, by using the light flux controlling member (reflection surface) described in PTL 1, it is possible to make the light distribution characteristics of the illuminating apparatus (LED lamp) close to the light distribution characteristics of an incandescent lamp to a certain extent.

CITATION LIST

Patent Literature

PTL 1
Patent Document 1: Japanese Patent Application Laid-Open No. 2003-258319

SUMMARY OF INVENTION

Technical Problem

However, the illuminating apparatus described in PTL 1 has a problem in that the balance in light distribution characteristics is not good. When illuminating apparatus 10 described in PTL 1 is used, only light emitted from LEDs 12 reaches space A on the front side of the top end of case 14 as shown in FIG. 1. On the other hand, reflected light from aluminum plate 16 as well as emitted light from LEDs 12 reaches space B on the rear side of the top end of case 14. Accordingly, space A and space B are different in brightness from each other. Therefore, when illuminating apparatus 10 described in PTL 1 is covered with cover 20, the amount of light reaching cover 20 greatly varies in the upper part and the lower part of cover 20 as shown in FIG. 2, thereby forming a boundary of light and shade in cover 20.

Therefore, an object of the invention is to provide a light flux controlling member which is used for an illuminating apparatus including a light-emitting element and which can distribute light in all of the forward direction, the lateral direction, and the backward direction with good balance. Another object of the invention is to provide an illuminating apparatus including the light flux controlling member.

Solution to Problem

To achieve the above-mentioned object, according to an aspect of the invention, there is provided a light flux controlling member that controls distribution of light emitted from a light-emitting element, including: a first light flux controlling member on which at least a part of light emitted from the light-emitting element is incident, that controls the incident light to have a predetermined light distribution characteristic, and that emits the controlled light; and a second light flux controlling member that reflects at least a part of the light emitted from the first light flux controlling member and that transmits the other light, wherein the first light flux controlling member includes an incidence surface on which at least a part of light emitted from the light-emitting element is incident, a total reflection surface that reflects a part of light incident on the incidence surface toward the second light flux controlling member, and an emission surface that emits a part of light incident on the incidence surface and light reflected by the total reflection surface, the second light flux controlling member includes a reflection surface that opposes the first light flux controlling member and that reflects a part of light emitted from the first light flux controlling member, the reflection surface is a rotational symmetric surface with the optical axis of the light-emitting element as a rotation axis and is formed so that a generating line of the rotational symmetric surface is a curved line concave with respect to the first light flux controlling member, and the outer peripheral portion of the reflection surface is formed at a position farther from the light-emitting element in the direction of the optical axis of the light-emitting element than the position of the center of the reflection surface.

According to another aspect of the invention, there is provided an illuminating apparatus including: one or more light-emitting elements; the light flux controlling member according to the above-mentioned aspect; and a cover that diffuses and transmits reflected light and transmitted light from the light flux controlling member.

Advantageous Effects of Invention

An illuminating apparatus having the light flux controlling member according to the invention exhibits light distribution characteristics closer to an incandescent lamp, compared with a conventional illuminating apparatus.

BRIEF DESCRIPTION OF DRAWINGS

FIG. 13A is a cross-sectional view of an illuminating apparatus according to Embodiment 3;

FIGS. 13B and 13C are partially-enlarged views of a dotted circle illustrated in FIG. 13A;

DESCRIPTION OF EMBODIMENTS

Now, embodiments of the present invention will be described in detail with reference to the accompanying drawings. In the following description, an illuminating apparatus which can be used instead of an incandescent lamp will be mentioned as a representative example of an illuminating apparatus according to the invention.

Embodiment 1

Configuration of Illuminating Device

Figure 1:
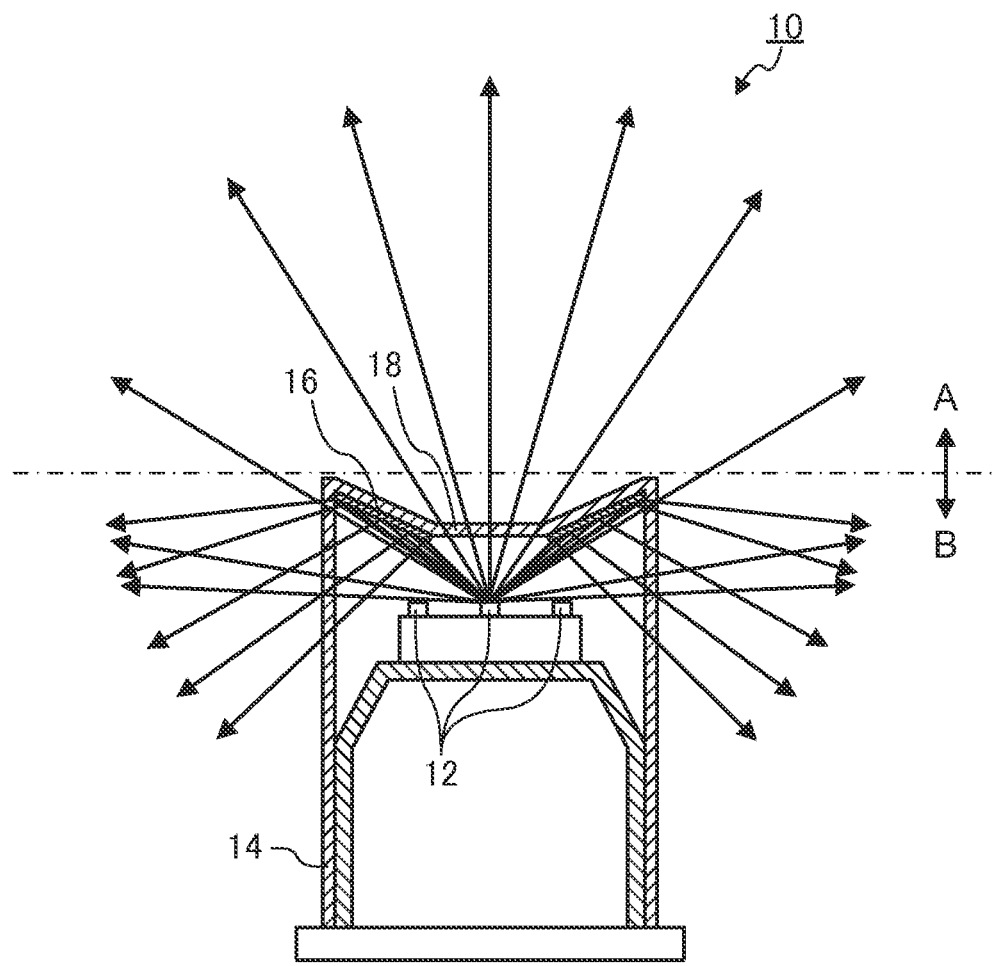
FIG. 1 is a schematic diagram illustrating the configuration of an illuminating apparatus described in PTL 1.
Figure 2:
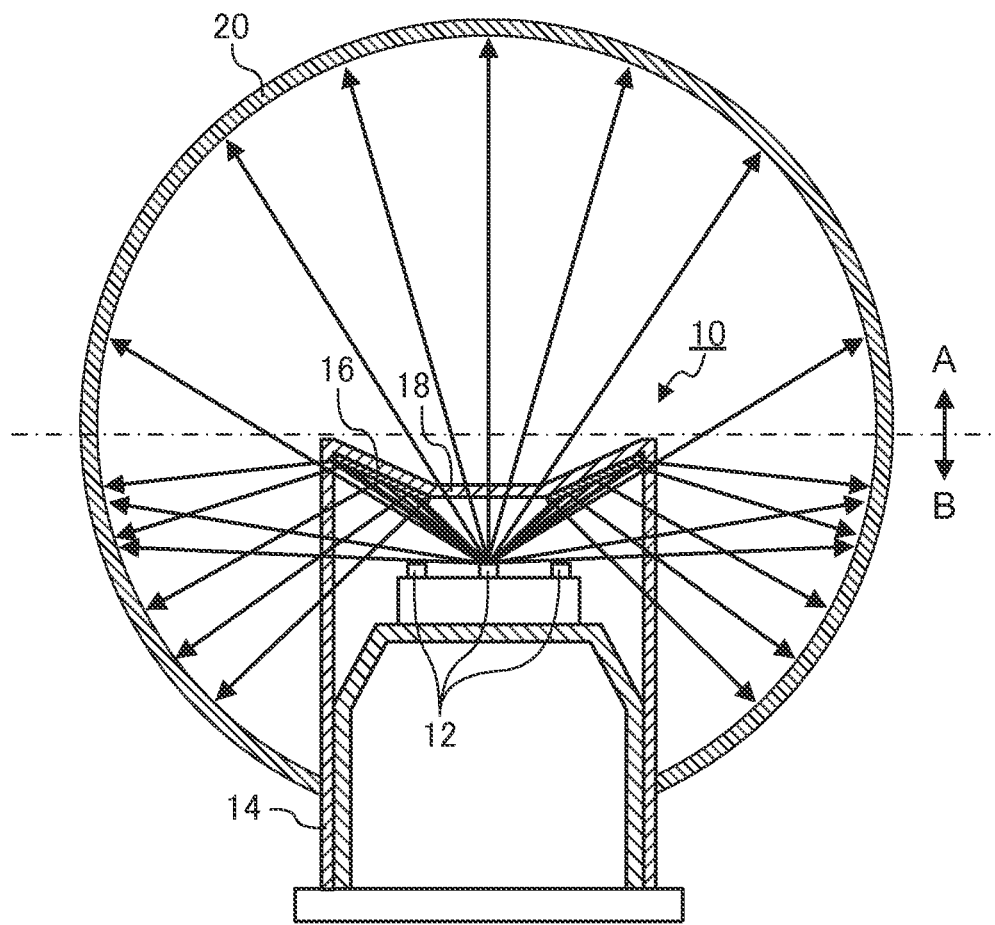
FIG. 2 is a schematic diagram illustrating a state where a cover is provided to the illuminating apparatus described in PTL 1.
Figure 3:
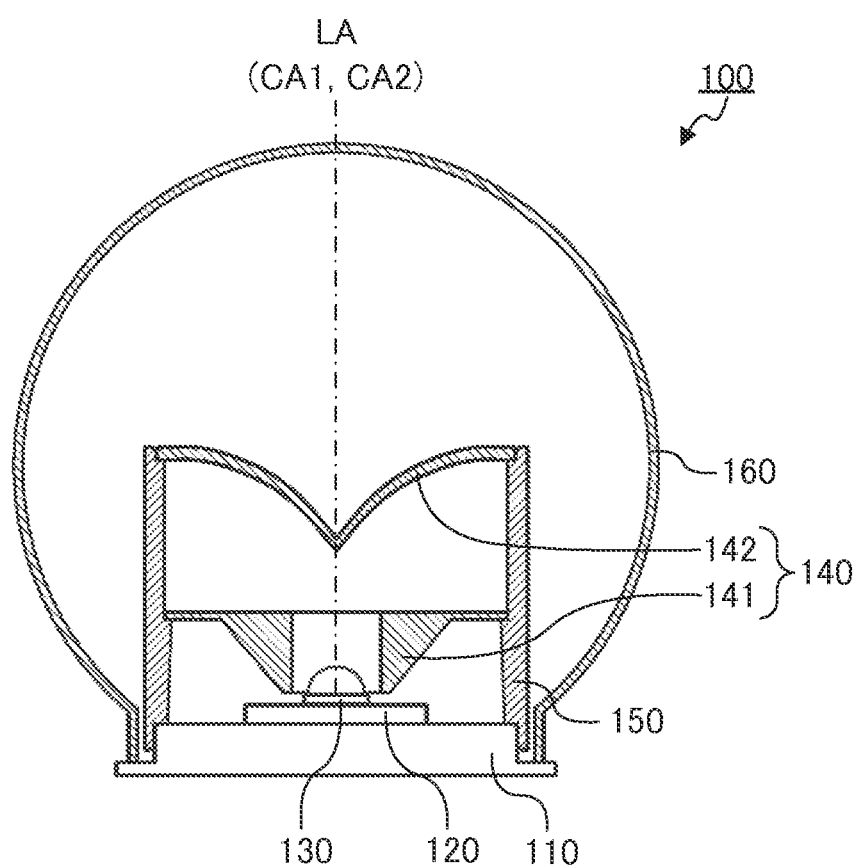
FIG. 3 is a cross-sectional view of an illuminating apparatus according to Embodiment 1.

FIG. 3 is a cross-sectional view illustrating the configuration of an illuminating apparatus according to Embodiment 1 of the invention. As shown in FIG. 3, illuminating apparatus 100 includes pedestal 110, substrate 120, light-emitting element 130, light flux controlling member 140, holder 150, and cover 160. The constituents will be described below.

(1) Pedestal, Substrate, and Light-Emitting Element

Light-emitting element 130 is a light source of illuminating apparatus 100 and is mounted on substrate 120 fixed onto pedestal 110. For example, light-emitting element 130 is a light-emitting diode (LED) such as a white light-emitting diode. The shape of substrate 120 is not particularly limited as long as light-emitting element 130 can be mounted thereon, and may not be a plate shape. The shape of pedestal 110 is not particularly limited as long as it can fix at least substrate 120, and may not be a plate shape.

(2) Light Flux Controlling Member

Light flux controlling member 140 controls distribution of light emitted from light-emitting element 130. As shown in FIG. 3, light flux controlling member 140 includes first light flux controlling member 141 and second light flux controlling member 142.

(2-1) First Light Flux Controlling Member

Figure 4A:
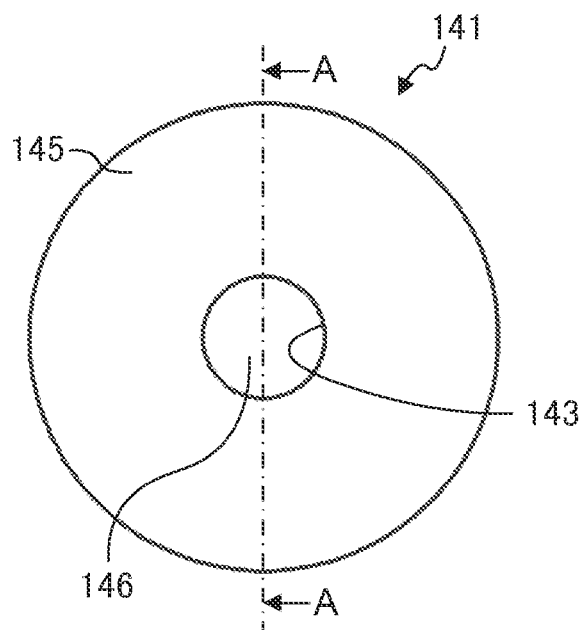
FIG. 4A is a plan view of a first light flux controlling member.
Figure 4B:
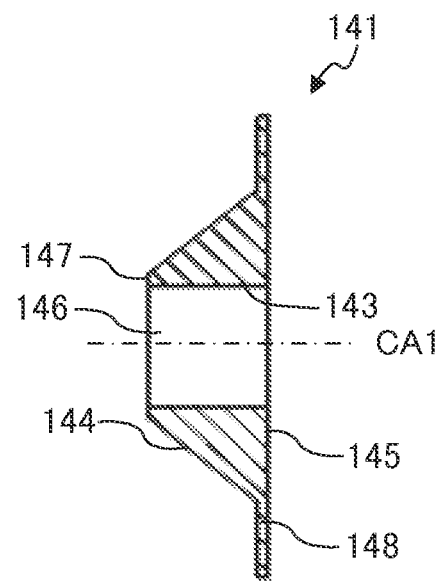
FIG. 4B is a cross-sectional view taken along line A-A of FIG. 4A.
Figure 4C:
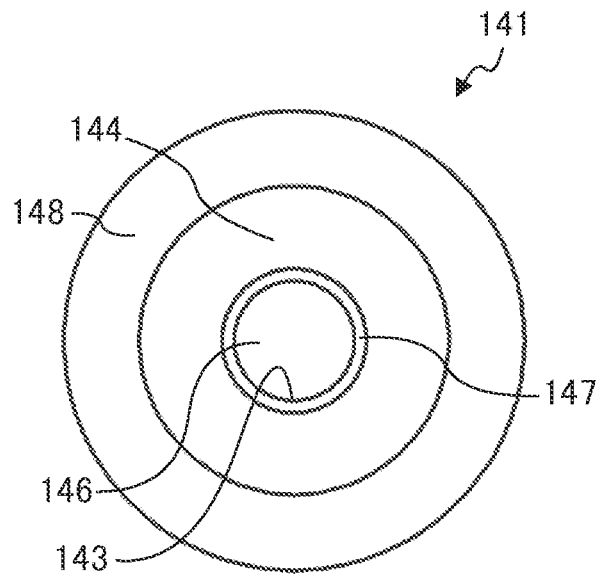
FIG. 4C is a bottom view of the first light flux controlling member.
Figure 4D:
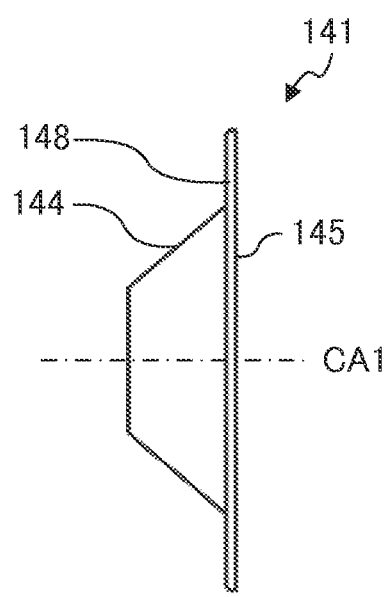
FIG. 4D is a side view of the first light flux controlling member.

FIGS. 4A to 4D are diagrams illustrating the configuration of first light flux controlling member 141. FIG. 4A is a plan view, FIG. 4B is a cross-sectional view taken along line A-A of FIG. 4A, FIG. 4C is a bottom view, and FIG. 4D is a side view.

First light flux controlling member 141 controls the traveling direction of some light emitted from light-emitting element 130. First light flux controlling member 141 functions to further narrow the light distribution of light emitted from first light flux controlling member 141 than that of light emitted from light-emitting element 130. As shown in FIG. 4A, first light flux controlling member 141 is a member of which the shape in a plan view is substantially circular. First light flux controlling member 141 is supported by holder 150, and is disposed on light-emitting element 130 with an air layer interposed therebetween so that central axis CA1 thereof matches optical axis LA of light-emitting element 130 (see FIG. 3).

As shown in FIGS. 4A to 4D, first light flux controlling member 141 includes incidence surface 143 on which a part of light emitted from light-emitting element 130 is incident, total reflection surface 144 that totally reflects a part of light incident from incidence surface 143, and emission surface 145 that emits a part of light incident from incidence surface 143 and light reflected by total reflection surface 144. Total reflection surface 144 does not reflect all light to be emitted from the emission surface of light-emitting element 130. Total reflection surface 144 is designed to totally reflect light emitted from the center of light-emitting element 130 (an intersection of optical axis LA and light-emitting element 130) and the vicinity thereof and to direct the reflected light to second light flux controlling member 142.

First light flux controlling member 141 is formed, for example, by injection molding. The material of first light flux controlling member 141 is not particularly limited as long as it has high transmissivity to transmit light of a desired wavelength. Examples of the material of first light flux controlling member 141 include light-transmitting resins such as polymethyl methacrylate (PMMA), polycarbonate (PC), and an epoxy resin (EP) and glass.

Incidence surface 143 causes a part of light emitted from light-emitting element 130 to enter first light flux controlling member 141. Incidence surface 143 is an inner surface of through-hole 146 formed at the center of first light flux controlling member 141 when seen in a plan view. Incidence surface 143 is a rotational symmetric surface with central axis CA1 of first light flux controlling member 141 as a rotation axis. That is, incidence surface 143 has a cylindrical shape having central axis CA1 as a central axis. The shape of incidence surface 143 is not limited to this shape, but may be, for example, a truncated cone shape having central axis CA1 as a central axis.

Total reflection surface 144 totally reflects a part of light incident from incidence surface 143 toward second light flux controlling member 142. Total reflection surface 144 is a surface extending from the outer edge of bottom portion 147 of first light flux controlling member 141 to the outer edge of emission surface 145. Flange 148 may be installed between the outer edge of total reflection surface 144 and the outer edge of emission surface 145. Total reflection surface 144 is a rotational symmetric surface about central axis CA1 of first light flux controlling member 141. The diameter of total reflection surface 144 gradually increases from bottom portion 147 to first emission surface 145. The generating line constituting total reflection surface 144 is an arc-like curve convex to the outside (the side away from central axis CA1). The generating line of total reflection surface 144 may be set to a straight line depending on the light distribution characteristics required for illuminating apparatus 100. That is, total reflection surface 144 may have a tapered shape. The "generating line" means a straight line used to draw a ruled surface, and is used as a term including a curve used to draw total reflection surface 144 which is a rotational symmetric surface in the invention.

Emission surface 145 emits a part of light incident from incidence surface 143 and light totally reflected by total reflection surface 144 toward second light flux controlling member 142. Emission surface 145 is a surface located on the opposite side of bottom portion 147 in first light flux controlling member 141. That is, emission surface 145 is disposed to oppose second light flux controlling member 142. Through-hole 146 is formed at the center of emission surface 145.

(2-2) Second Light Flux Controlling Member

Figure 5A:
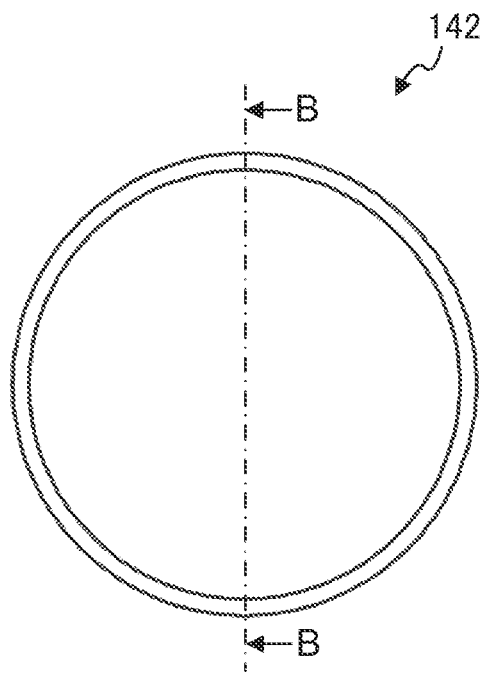
FIG. 5A is a plan view of a second light flux controlling member.
Figure 5B:
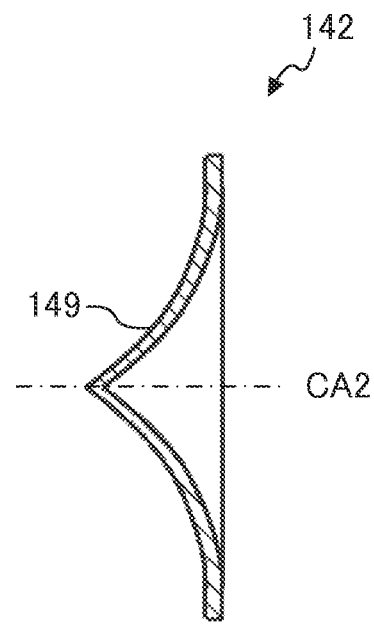
FIG. 5B is a cross-sectional view taken along line B-B of FIG. 5A.
Figure 5C:
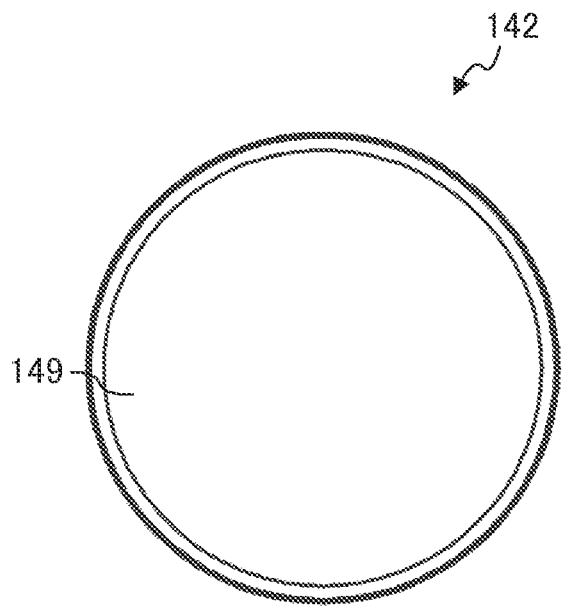
FIG. 5C is a bottom view of the second light flux controlling member.
Figure 5D:
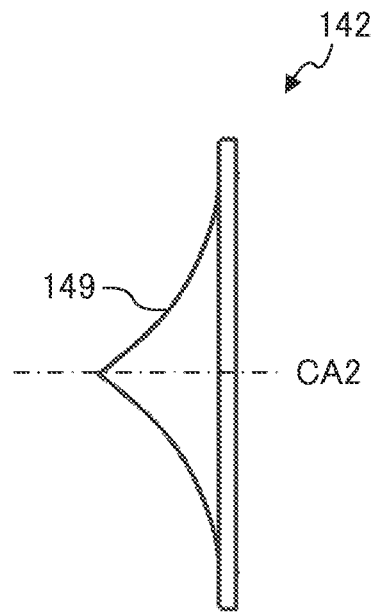
FIG. 5D is a side view of the second light flux controlling member.

FIGS. 5A to 5D are diagrams illustrating the configuration of second light flux controlling member 142. FIG. 5A is a plan view, FIG. 5B is a cross-sectional view taken along line B-B of FIG. 5A, FIG. 5C is a bottom view, and FIG. 5D is a side view.

Second light flux controlling member 142 reflects a part of light emitted from light-emitting element 130 and light emitted from first light flux controlling member 141 while controlling the traveling direction thereof and transmits the other part. As shown in FIG. 5A, second light flux controlling member 142 is a member having a substantially circular shape in a plan view. Second light flux controlling member 142 is supported by holder 150, and is disposed on first light flux controlling member 141 with an air layer interposed therebetween so that central axis CA2 thereof matches optical axis LA of light-emitting element 130.

Second light flux controlling member 142 reflects a part of light emitted from light-emitting element 130 and first light flux controlling member 141 and transmits the other part. Means for giving such a function to second light flux controlling member 142 is not particularly limited. For example, a transflective film can be formed on the surface (the surface opposing light-emitting element 130 and first light flux controlling member 141) of second light flux controlling member 142 formed of a light-transmitting material. Examples of the light-transmitting material include transparent resin materials such as polymethyl methacrylate (PMMA), polycarbonate (PC), and an epoxy resin (EP) and glass. Examples of the transflective film include dielectric multi-layered films such as a multi-layered film of $TiO_2$ and $SiO_2$, a multi-layered film of $ZrO_2$ and $SiO_2$, and a multi-layered film of $Ta_2O_5$ and $SiO_2$, or metal foils formed of aluminum (Al) or the like. A light scattering material such as beads may be dispersed in second light flux controlling member 142 formed of a light-transmitting material. That is, second light flux controlling member 142 may be formed of a material reflecting a part of light and transmitting a part of light. A light-transmitting portion may be formed in second light flux controlling member 142 formed of a light-reflecting material. Examples of the light-reflecting material include white resins and metals. Examples of the light-transmitting portion include a through-hole and a bottomed concave portion. In the latter, light emitted from light-emitting element 130 and first light flux controlling member 141 is transmitted by the bottom portion (a portion having a small thickness) of the concave portion. For example, second light flux controlling member 142 having both functions of light reflection and light transmission can be formed using white polymethyl methacrylate with visible ray transmittance of about 20% and reflectance of about 78%. The surface (reflection surface 149 to be described later) of second light flux controlling member 142 opposing light-emitting element 130 and first light flux controlling member 141 is preferably formed so that the reflection intensity in the specular direction of incident light is larger than the reflection intensities in the other directions. Therefore, the surface of second light flux controlling member 142 opposing light-emitting element 130 and first light flux controlling member 141 is formed to be a glossy surface.

Second light flux controlling member 142 includes reflection surface 149 that opposes first light flux controlling member 141 and that reflects a part of light emitted from first light flux controlling member 141. Reflection surface 149 reflects a part of light emitted from first light flux controlling member 141 toward holder 150. The reflected light passes through holder 150 and reaches the middle portion (side portion) and the lower portion of cover 160.

Reflection surface 149 of second light flux controlling member 142 is a rotational symmetric (circular symmetric) surface with central axis CA2 of second light flux controlling member 142 as a rotation center. As shown in FIG. 3, the generating line extending from the center of the rotational symmetric surface to the outer peripheral portion is a curve concave with respect to light-emitting element 130 and first light flux controlling member 141, and reflection surface 149 is a curved surface formed by rotating the generating line by 360°. That is, reflection surface 149 has an aspheric curved surface of which the height from light-emitting element 130 increases from the center to the outer peripheral portion. The outer peripheral portion of reflection surface 149 is formed at a position farther away from light-emitting element 130 in the direction of optical axis LA of light-emitting element 130, compared with the center of reflection surface 149. For example, reflection surface 149 is an aspheric curved surface of which the height from light-emitting element 130 increases from the center to the outer peripheral portion or an aspheric curved surface of which the height from light-emitting element 130 (substrate 120) increases from the center to a predetermined position and the height from light-emitting element 130 decreases from the predetermined position to the outer peripheral portion as moving from the center to the outer peripheral portion. In the former, the oblique angle of reflection surface 149 with respect to the plane direction of substrate 120 decreases from the center to the outer peripheral portion. On the other hand, in the latter, a point at which the oblique angle with respect to the plane direction of substrate 120 is zero (parallel to substrate 120) is present at a position, which is close to the outer peripheral portion, between the center and the outer peripheral portion in reflection surface 149. As described above, the "generating line" means a straight line used to draw a ruled surface, and is used as a term including a curve used to draw reflection surface 149 which is a rotational symmetric surface in the invention.

(3) Holder

Figure 6A:
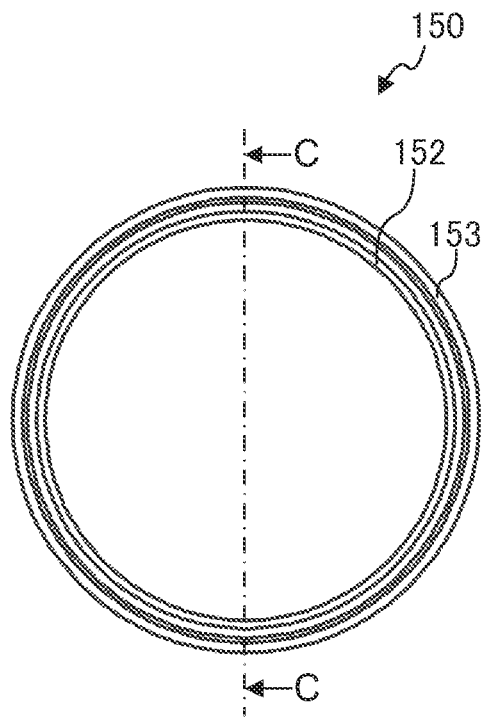
FIG. 6A is a plan view of a holder.
Figure 6B:
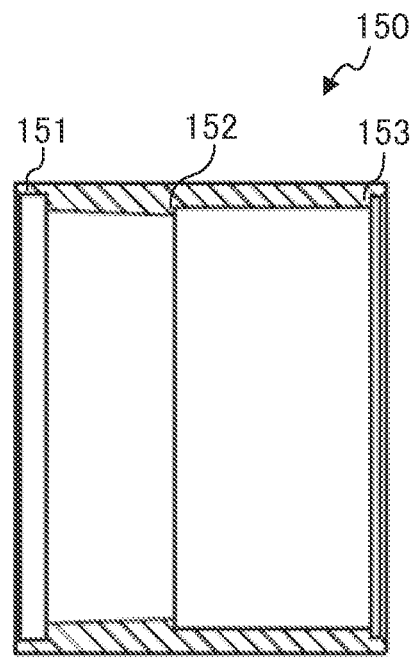
FIG. 6B is a cross-sectional view taken along line C-C of FIG. 6A.
Figure 6C:
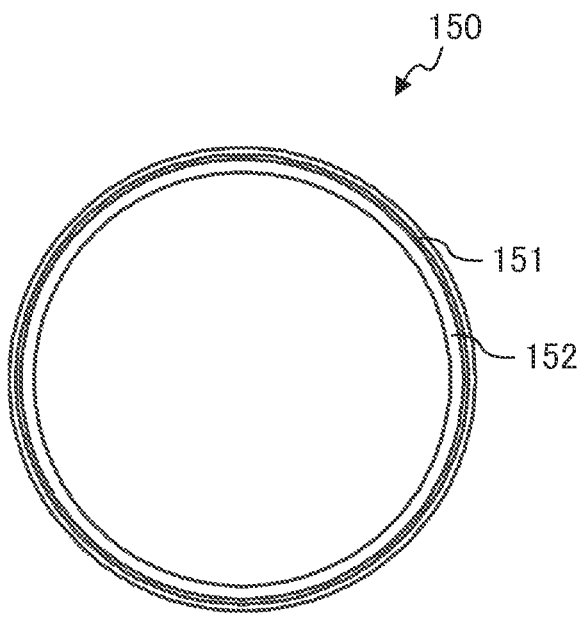
FIG. 6C is a bottom view of the holder.
Figure 6D:
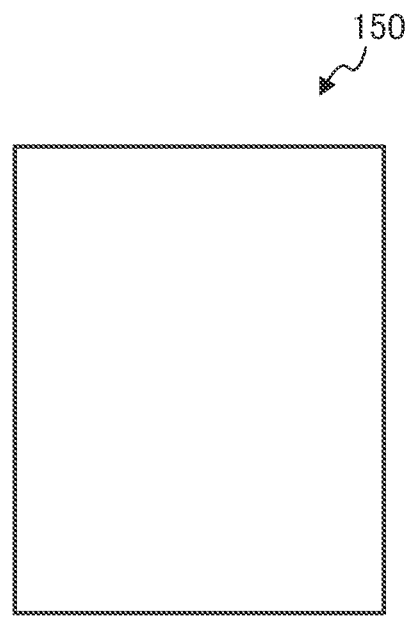
FIG. 6D is a side view of the holder.

FIGS. 6A to 6D are diagrams illustrating the configuration of holder 150. FIG. 6A is a plan view, FIG. 6B is a cross-sectional view taken along line C-C of FIG. 6A, FIG. 6C is a bottom view, and FIG. 6D is a side view.

Holder 150 is positioned with respect to pedestal 110 and positions first light flux controlling member 141 and second light flux controlling member 142 with respect to light-emitting element 130. Holder 150 is a transparent member having a substantially cylindrical shape. Holder 150 is formed, for example, by injection molding. The material of holder 150 is not particularly limited as long as it can transmit light of a desired wavelength. Examples of the material of holder 150 include light-transmitting resins such as polymethyl methacrylate (PMMA), polycarbonate (PC), and an epoxy resin (EP) and glass. When light diffusing performance is given to holder 150, the light-transmitting materials may include a scattering material or a light diffusion process may be performed on the surface of holder 150.

Holder 150 includes leg portion 151, first stepped portion 152, and second stepped portion 153. Leg portion 151 is formed on the lower portion of holder 150 and positions holder 150 with respect to pedestal 110. First stepped portion 152 is formed at the middle portion of the inner surface of holder 150 and positions first light flux controlling member 141 with respect to holder 150 so that optical axis LA of light-emitting element 130 matches central axis CA1 of first light flux controlling member 141. Second stepped portion 153 is formed in the lower portion of holder 150 and positions second light flux controlling member 142 with respect to holder 150 so that optical axis LA of light-emitting element 130 matches central axis CA2 of second light flux controlling member 142.

The shape of holder 150 is not limited to the cylindrical shape, as long as it can position first light flux controlling member 141 and second light flux controlling member 142. For example, holder 150 may have a part penetrating the holder from the inner surface to the outer surface in consideration of light distribution characteristics of illuminating apparatus 100 or emission quality on the outer surface of cover 160.

(4) Cover

Cover 160 diffuses and transmits light (reflected light and transmitted light) of which the traveling direction is controlled by light flux controlling member 140. Cover 160 is a member in which a hollow portion having an opening is formed. Substrate 120, light-emitting element 130, light flux controlling member 140, and holder 150 are disposed in the hollow portion of cover 160.

Means for giving light diffusing performance to cover 160 is not particularly limited. For example, a light diffusing process (for example, roughening process) may be performed on the inner surface or the outer surface of cover 160, or cover 160 may be formed using a light-diffusing material (for example, a light-transmitting material including scattering materials such as beads). The shape of cover 160 is not particularly limited as long as it can provide a desired light distribution characteristic. For example, cover 160 may have a spherical segment shape (a shape obtained by horizontally cutting a part of a spherical surface).

Figure 7A:
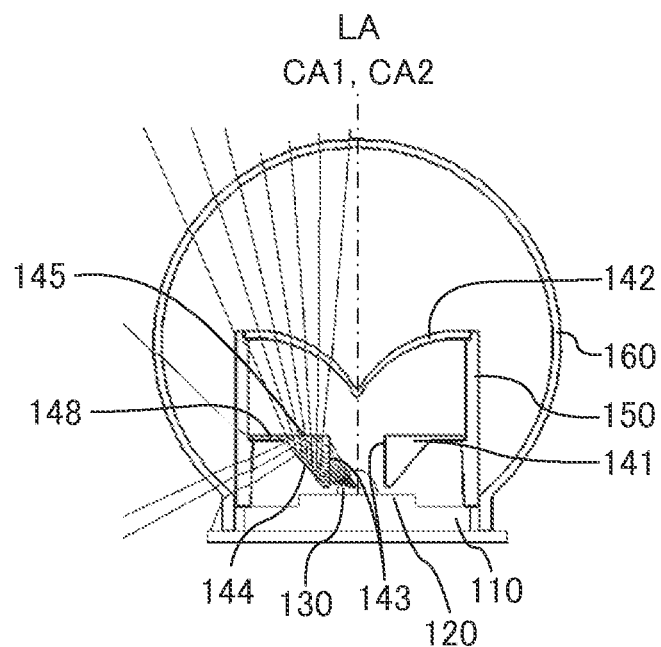
FIGS. 7A and 7B are diagrams illustrating the optical path of light traveling at large angles with respect to the optical axis of a light-emitting element out of light from the light-emitting element.
Figure 7B:
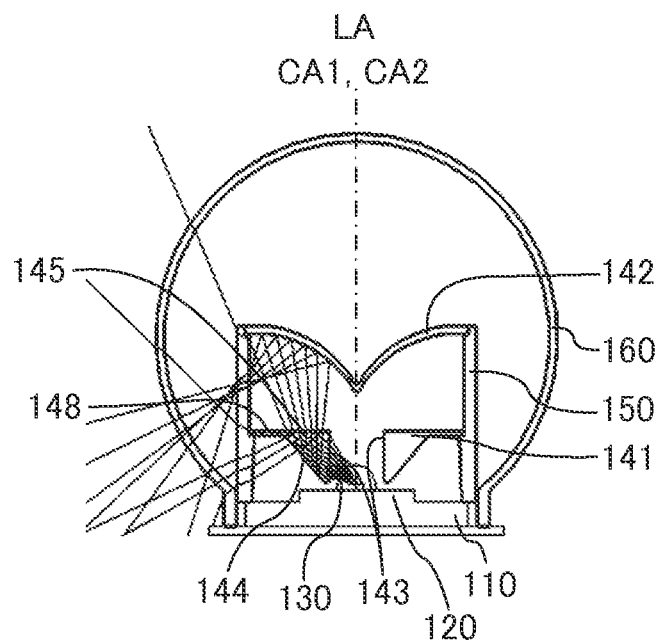
Figure 8A:
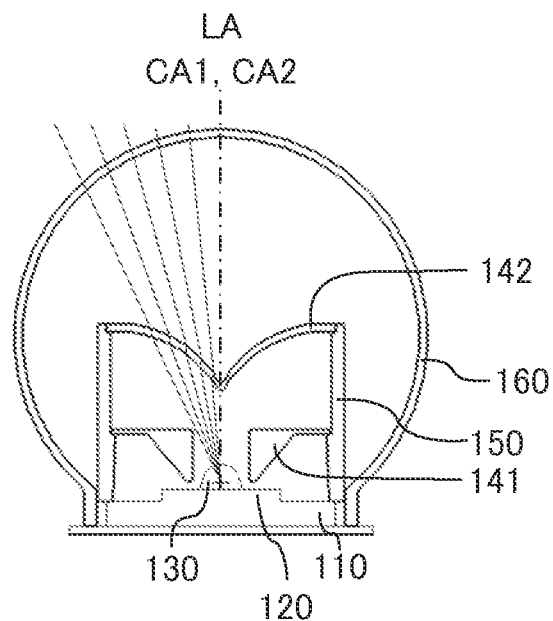
FIGS. 8A and 8B are diagrams illustrating the optical path of light traveling at small angles with respect to the optical axis of a light-emitting element out of light from the light-emitting element.
Figure 8B:
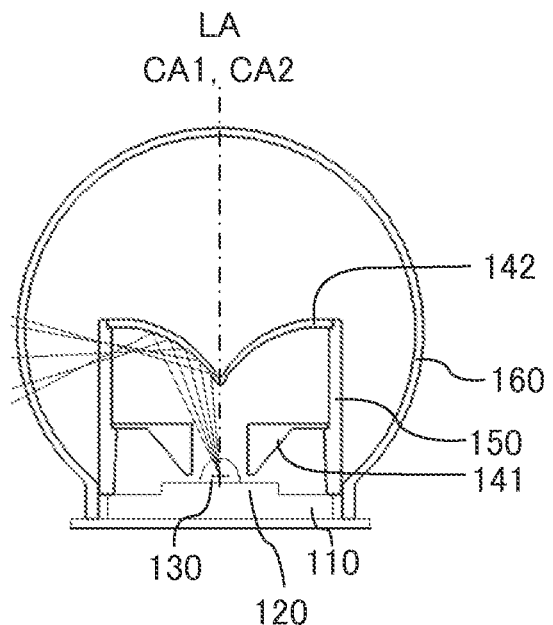

The optical path of light emitted from light-emitting element 130 will be described with reference to FIGS. 7A and 7B and FIGS. 8A and 8B. FIGS. 7A and 7B are diagrams illustrating the optical path of light traveling at large angles with respect to optical axis LA of light-emitting element 130 out of light from light-emitting element 130. On the other hand, FIGS. 8A and 8B are diagrams illustrating the optical path of light traveling at small angles with respect to optical axis LA of light-emitting element 130 out of light from light-emitting element 130. FIGS. 7A and 8A are diagrams illustrating the optical path when light reaching second light flux controlling member 142 passes through second light flux controlling member 142. On the other hand, FIGS. 7B and 8B are diagrams illustrating the optical path when light reaching second light flux controlling member 142 is reflected by reflection surface 149 of second light flux controlling member 142.

As shown in FIGS. 7A and 7B, light traveling at large angles with respect to optical axis LA of light-emitting element 130 is incident on first light flux controlling member 141 from incidence surface 143. A part of the light incident on first light flux controlling member 141 is reflected to second light flux controlling member 142 by total reflection surface 144 and is emitted from emission surface 145. A part of the light incident on first light flux controlling member 141 is totally reflected by emission surface 145 and is emitted from total reflection surface 144. Light emitted from total reflection surface 144 reaches the lower portion of cover 160 (see FIG. 7B).

A part of light emitted from emission surface 145 of first light flux controlling member 141 passes through second light flux controlling member 142 and reaches the upper portion of cover 160 (see FIG. 7A). A part of light emitted from emission surface 145 of first light flux controlling member 141 is reflected by reflection surface 149 of second light flux controlling member 142 and reaches the middle portion (side portion) and the lower portion of cover 160 (see FIG. 7B). In this case, light reflected by the central portion of second light flux controlling member 142 is directed to the middle portion of cover 160. On the other hand, light reflected by the outer peripheral portion of second light flux controlling member 142 is directed to the lower portion of cover 160.

As shown in FIGS. 8A and 8B, light traveling at small angles with respect to optical axis LA of light-emitting element 130 including light traveling along the optical axis is not incident on first light flux controlling member 141 but directly reaches second light flux controlling member 142 through a through-hole formed in first light flux controlling member 141. A part of light reaching second light flux controlling member 142 passes through second light flux controlling member 142 and reaches the upper portion of cover 160 (see FIG. 8A). On the other hand, a part of light reaching second light flux controlling member 142 is reflected by reflection surface 149 of second light flux controlling member 142 and reaches the middle portion and the lower portion of cover 160 through holder 150 (see FIG. 8B). In this case, light reflected by the central portion of second light flux controlling member 142 is directed to the middle portion of cover 160. Light reflected by the outer peripheral portion of second light flux controlling member 142 is directed to the lower portion of cover 160.

Method of Manufacturing Light Flux Controlling Member

A method of manufacturing light flux controlling member 140 is not particularly limited. For example, light flux controlling member 140 can be manufactured in the following sequence.

First, first light flux controlling member 141 including incidence surface 143, total reflection surface 144, and emission surface 145 is formed by injection molding using a colorless and transparent resin material.

Second light flux controlling member 142 including reflection surface 149 is manufactured by injection molding. The method of manufacturing second light flux controlling member 142 is not particularly limited. For example, second light flux controlling member 142 can be manufactured by performing an injection molding process using a colorless and transparent resin material and then depositing a transflective film on the surface (the surface opposing first light flux controlling member 141), which becomes reflection surface 149, of the resultant resin molded product. Second light flux controlling member 142 can be manufactured by performing an injection-molding process using a white resin material.

Holder 150 including leg portion 151, first stepped portion 152, and second stepped portion 153 is manufactured by performing an injection molding process using a colorless and transparent resin material.

Subsequently, first light flux controlling member 141 is attached to first stepped portion 152 of holder 150 and second light flux controlling member 142 is attached to second stepped portion 153 of holder 150. An adhesive or the like may be used to attach first light flux controlling member 141 and second light flux controlling member 142. Light flux controlling member 140 can be manufactured through the above-mentioned sequence.

First light flux controlling member 141 and holder 150 may be molded as a unified body. In this case, light flux controlling member 140 can be manufactured by attaching second light flux controlling member 142 to first light flux controlling member 141 and holder 150 molded as a unified body.

Advantages

In illuminating apparatus 100 according to Embodiment 1, the amount of light reaching second light flux controlling member 142 is increased by reflecting light emitted from light-emitting element 130 at large angles with respect to optical axis LA of light-emitting element 130 through the use of total reflection surface 144 of first light flux controlling member 141. Accordingly, illuminating apparatus 100 according to Embodiment 1 can increase the amount of light reaching the upper portion of cover 160. In illuminating apparatus 100 according to Embodiment 1, the amount of light reaching the middle portion and the lower portion of cover 160 is decreased by reflecting light emitted from light-emitting element 130 at large angles with respect to optical axis LA of light-emitting element 130 through the use of total reflection surface 144 of first light flux controlling member 141. The balance of the amount of light reaching the upper portion of cover 160 and the amount of light reaching the middle portion and the lower portion of cover 160 can be adjusted by controlling light transmittance and light reflectance of second light flux controlling member 142.

In this way, light flux controlling member 140 according to Embodiment 1 can suppress unevenness of light reaching cover 160 by making the amounts of emitted light in the forward direction, the lateral direction, and the backward direction uniform. That is, light flux controlling member 140 according to Embodiment 1 can realize light distribution characteristics close to those of an incandescent lamp by controlling the amounts of emitted light in the forward direction, the lateral direction, and the backward direction. Illuminating apparatus 100 according to Embodiment 1 can be used for indoor illumination instead of an incandescent lamp. Illuminating apparatus 100 according to Embodiment 1 can reduce its power consumption in comparison with the incandescent lamp and can be used for a longer time than the incandescent lamp.

Light flux controlling member 140 according to Embodiment 1 reflects a part of light reaching second light flux controlling member 142 in the lateral direction (direction to the middle portion of cover 160) and the backward direction (direction to the lower portion of cover 160) through the use of reflection surface 149 and transmits a part of light in the forward direction (direction to the upper portion of cover 160). In this case, light flux controlling member 140 generates reflected light in the lateral direction in the central region of reflection surface 149 and generates reflected light in the backward direction in the outer peripheral region. Accordingly, illuminating apparatus 100 according to Embodiment 1 can efficiently illuminate an irradiated surface in the backward direction without interfering with pedestal 110.

Embodiment 2

Configuration of Illuminating Device

Figure 9:
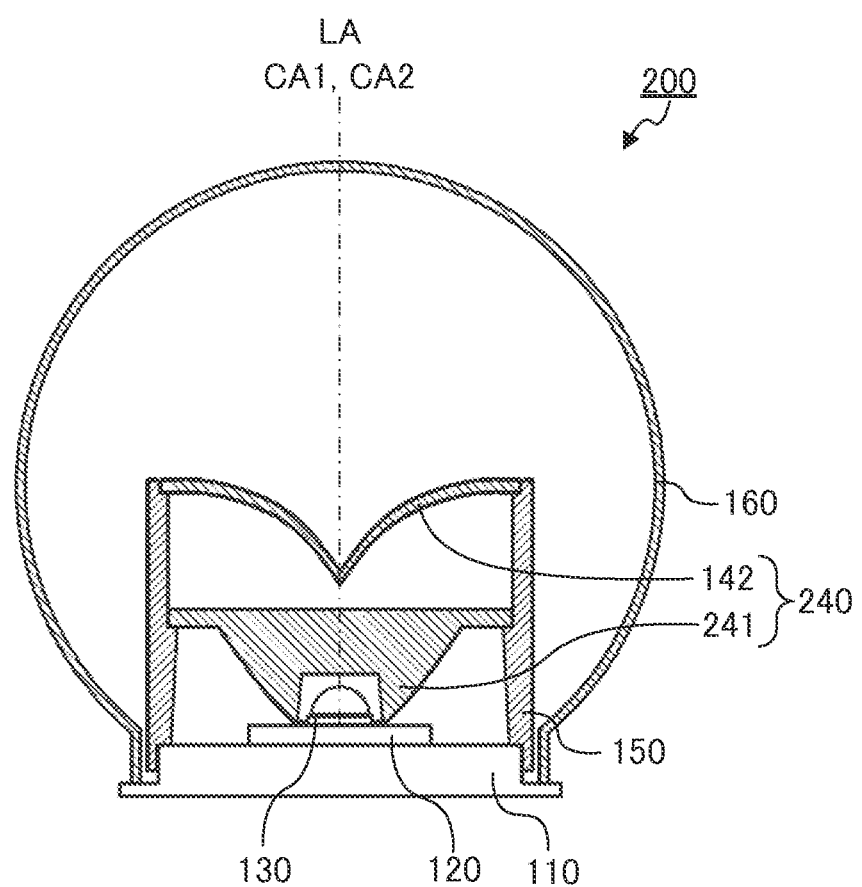
FIG. 9 is a cross-sectional view of an illuminating apparatus according to Embodiment 2.

FIG. 9 is a cross-sectional view illustrating the configuration of illuminating apparatus 200 according to Embodiment 2 of the invention. As shown in FIG. 9, illuminating apparatus 200 includes pedestal 110, substrate 120, light-emitting element 130, light flux controlling member 240, holder 150, and cover 160. Light flux controlling member 240 includes first light flux controlling member 241 and second light flux controlling member 142. Illuminating apparatus 200 according to Embodiment 2 is different from illuminating apparatus 100 according to Embodiment 1, in that first light flux controlling member 241 does not include a through-hole. Therefore, the same constituents as in illuminating apparatus 100 according to Embodiment 1 will be referenced by the same reference numerals and description thereof will not be repeated.

Light flux controlling member 240 includes first light flux controlling member 241 and second light flux controlling member 142. Second light flux controlling member 142 is the same as that in Embodiment 1 and thus description thereof will not be repeated.

Figure 10A:
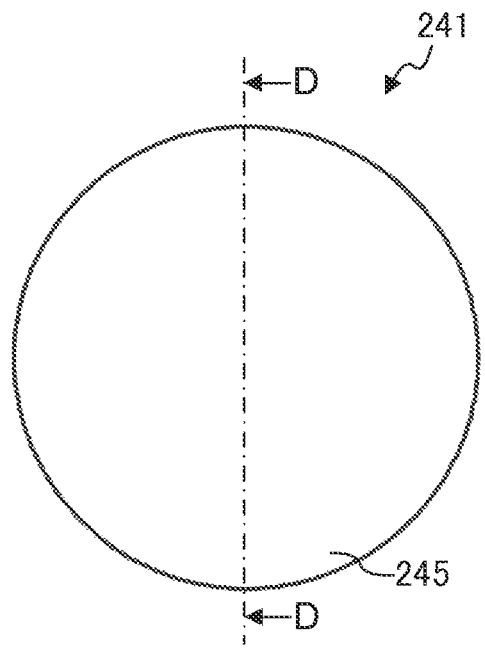
FIG. 10A is a plan view of a first light flux controlling member according to Embodiment 2.
Figure 10B:
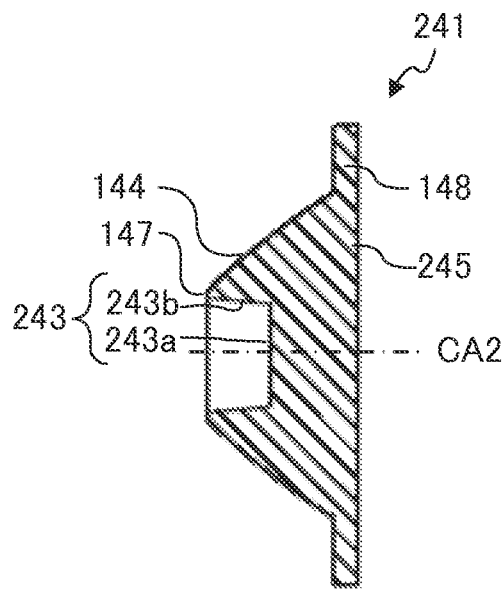
FIG. 10B is a cross-sectional view taken along line D-D of FIG. 10A.
Figure 10C:
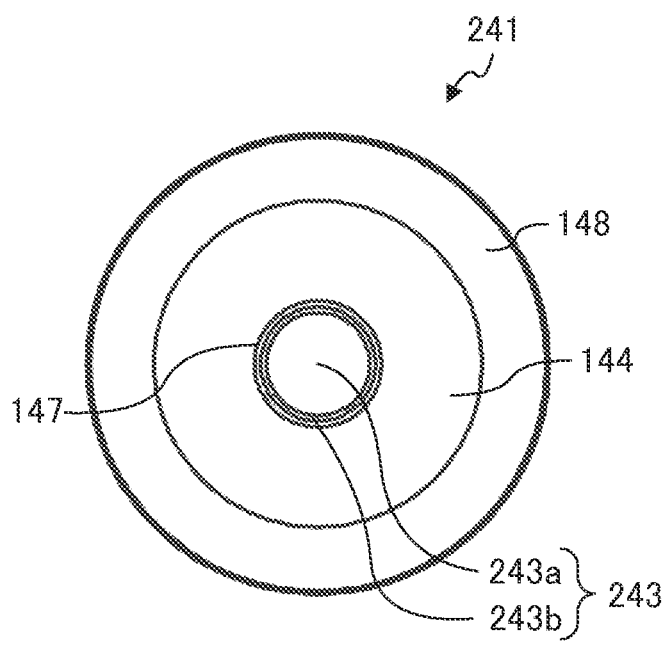
FIG. 10C is a bottom view of the first light flux controlling member.
Figure 10D:
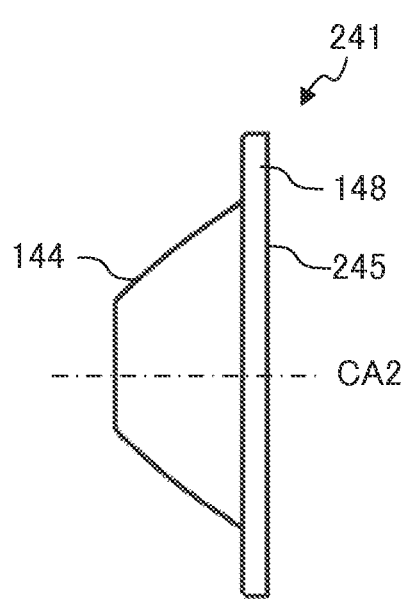
FIG. 10D is a side view of the first light flux controlling member.

FIGS. 10A to 10D are diagrams illustrating the configuration of first light flux controlling member 241. FIG. 10A is a plan view, FIG. 10B is a cross-sectional view taken along line D-D of FIG. 10A, FIG. 10C is a bottom view, and FIG. 10D is a side view.

As shown in FIG. 9 and FIGS. 10A to 10D, first light flux controlling member 241 includes incidence surface 243, total reflection surface 144, and emission surface 245.

Incidence surface 243 is an inner surface of a concave portion formed on bottom portion 147 of first light flux controlling member 241. Incidence surface 243 is formed at a position opposing light-emitting element 130 so as to intersect central axis CA1 of first light flux controlling member 241. Incidence surface 243 is a rotational symmetric surface with central axis CA1 as a center. Incidence surface 243 includes inner top surface 243a constituting the top surface of the concave portion and tapered inner side surface 243b constituting the side surface of the concave portion. The inner diameter of inner side surface 243b gradually increases from inner top surface 243a to the opening edge so that the inner diameter of the opening edge is larger than the inner diameter of the edge of inner top surface 243a.

Total reflection surface 144 is a surface extending from the outer edge of bottom portion 147 of first light flux controlling member 241 to the outer edge of emission surface 245. Total reflection surface 144 has the same configuration as total reflection surface 144 of first light flux controlling member 141 according to Embodiment 1 (see FIGS. 10B and 10D).

Emission surface 245 is a surface located on the opposite side of incidence surface 243 (bottom portion 147) in first light flux controlling member 241, and is formed to intersect optical axis LA of light-emitting element 130. Unlike first light flux controlling member 141 of Embodiment 1, a through-hole is not formed in emission surface 245.

Figure 11A:
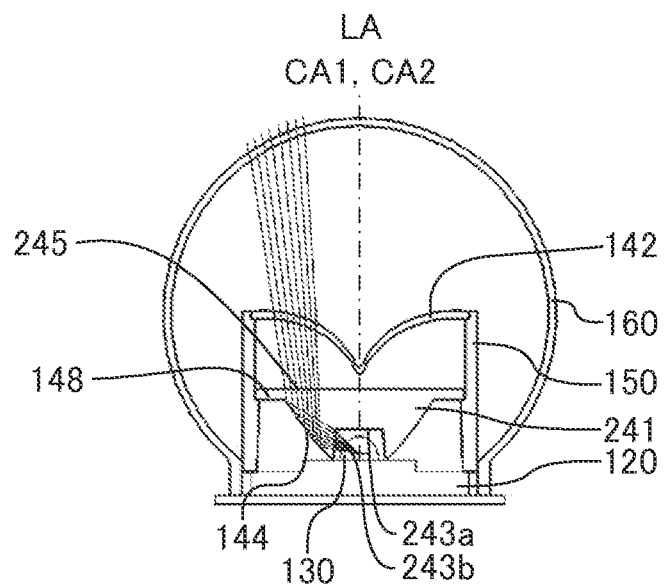
FIGS. 11A and 11B are diagrams illustrating the optical path of light traveling at large angles with respect to the optical axis of a light-emitting element out of light from the light-emitting element.
Figure 11B:
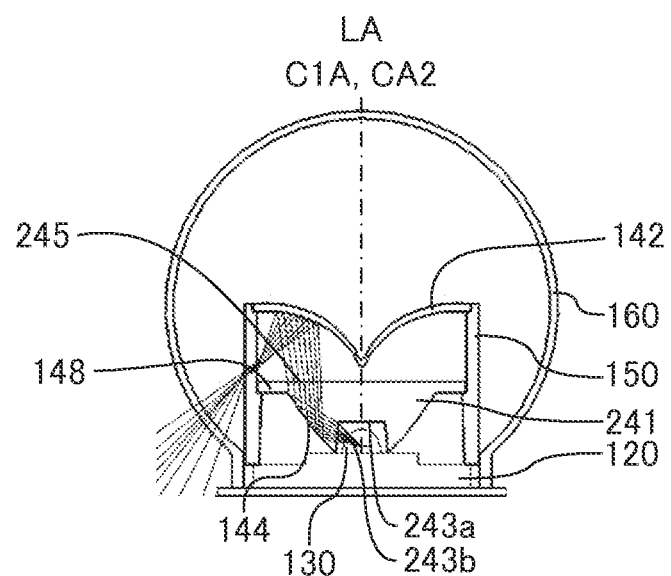
Figure 12A:
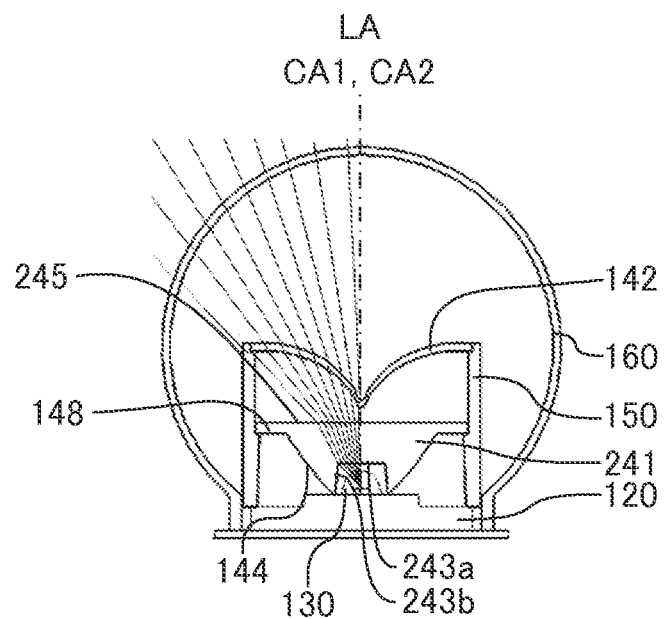
FIGS. 12A and 12B are diagrams illustrating the optical path of light traveling at small angles with respect to the optical axis of a light-emitting element out of light from the light-emitting element.
Figure 12B:
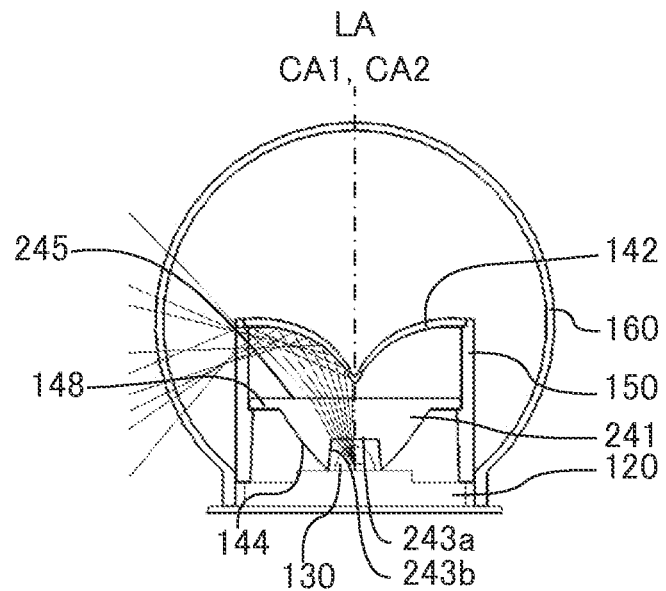

The optical path of light emitted from light-emitting element 130 in illuminating apparatus 200 according to Embodiment 2 will be described with reference to FIGS. 11A and 11B and FIGS. 12A and 12B. FIGS. 11A and 11B are diagrams illustrating the optical path of light traveling at large angles with respect to optical axis LA of light-emitting element 130 out of light from light-emitting element 130. FIGS. 12A and 12B are diagrams illustrating the optical path of light traveling at small angles with respect to optical axis LA of light-emitting element 130 out of light from light-emitting element 130. FIGS. 11A and 12A are diagrams illustrating the optical path when light reaching second light flux controlling member 142 passes through second light flux controlling member 142. On the other hand, FIGS. 11B and 12B are diagrams illustrating the optical path when light reaching second light flux controlling member 142 is reflected by reflection surface 149 of second light flux controlling member 142.

As shown in FIGS. 11A and 11B, light traveling at large angles with respect to optical axis LA of light-emitting element 130 is incident on first light flux controlling member 241 from inner side surface 243b. A part of the light incident on first light flux controlling member 241 is reflected to second light flux controlling member 142 by total reflection surface 144 and is emitted from emission surface 245. A part of light emitted from emission surface 245 of first light flux controlling member 241 passes through second light flux controlling member 142 and reaches the upper portion of cover 160 (see FIG. 11A). A part of light emitted from emission surface 245 of first light flux controlling member 241 is reflected by second light flux controlling member 142 and reaches the middle portion and the lower portion of cover 160 (see FIG. 11B).

As shown in FIGS. 12A and 12B, light traveling at small angles with respect to optical axis LA of light-emitting element 130 is incident on first light flux controlling member 241 from inner top surface 243a and is emitted from emission surface 245 to second light flux controlling member 142. A part of light reaching second light flux controlling member 142 passes through second light flux controlling member 142 and reaches the upper portion of cover 160 (see FIG. 12A). On the other hand, a part of light reaching second light flux controlling member 142 is reflected by reflection surface 149 of second light flux controlling member 142 and reaches the middle portion and the lower portion of cover 160 (see FIG. 12B).

In this way, in illuminating apparatus 200 according to Embodiment 2, all the light reaching second light flux controlling member 142 is light incident on first light flux controlling member 241 and emitted from first light flux controlling member 241.

Advantages

Light flux controlling member 240 and illuminating apparatus 200 according to Embodiment 2 have the same advantages as light flux controlling member 140 and illuminating apparatus 100 according to Embodiment 1. When it is wanted to make the lower portion of cover 160 brighter using light reflected by emission surface 245 of the first light flux controlling member, it is preferable to use light flux controlling member 140 according to Embodiment 1 (see comparison of FIG. 7A and FIG. 11A).

Embodiment 3

Configuration of Illuminating Device

FIG. 13A is a cross-sectional view illustrating the configuration of illuminating apparatus 300 according to Embodiment 3 of the invention. As shown in FIG. 13A, illuminating apparatus 300 includes pedestal 110, substrate 120, light-emitting element 130, light flux controlling member 140, holder 350, and cover 160. Illuminating apparatus 300 according to Embodiment 3 is different from illuminating apparatus 100 according to Embodiment 1, in that plural ring-like convex portions 351 are disposed on the outer surface of holder 350. Therefore, the same constituents as in illuminating apparatus 100 according to Embodiment 1 will be referenced by the same reference numerals and description thereof will not be repeated.

Holder 350 positions first light flux controlling member 141 and second light flux controlling member 142 with respect to light-emitting element 130 and transmits light from first light flux controlling member 141 and second light flux controlling member 142. Holder 350 has a substantially cylindrical shape and includes leg portion 151, first stepped portion 152, and second stepped portion 153. As described above, plural ring-like convex portions 351 are formed on the outer surface of holder 350.

FIGS. 13B and 13C are enlarged cross-sectional views illustrating the part indicated by a dotted line in FIG. 13A. As shown in FIGS. 13B and 13C, plural convex portions 351 are formed to be parallel to pedestal 110. Each convex portion 351 includes a horizontal face extending in the direction perpendicular to the central axis of holder 350 and a tapered face inclined with respect to the horizontal face. In the example shown in FIG. 13B, the tapered face of each convex portion 351 is located under the horizontal face (on the side facing light-emitting element 130). In the example, shown in FIG. 13C, the tapered face is located above the horizontal face.

As described above, holder 350 transmits light from first light flux controlling member 141 and second light flux controlling member 142. In this case, holder 350 changes the traveling direction of light to be transmitted depending on the direction of the tapered face. That is, in the example shown in FIG. 13B, the traveling direction of light from first light flux controlling member 141 and second light flux controlling member 142 is changed to the forward direction (the direction directed to the upper portion of cover 160). On the other hand, in the example shown in FIG. 13C, the traveling direction of light from first light flux controlling member 141 and second light flux controlling member 142 is changed to the backward direction (the direction directed to the lower portion of cover 160).

Advantages

Since illuminating apparatus 300 according to Embodiment 3 can control the traveling direction of light in holder 350, the amount of emitted light in the forward direction, the lateral direction, and the backward direction can be controlled in more detail to realize the light distribution characteristics close to an incandescent lamp.

A roughening process may be performed on the outer surface of holder 350 instead of forming plural convex portions 351 thereon. Accordingly, it is possible to diffuse light transmitted by holder 350.

Embodiment 4

Configuration of Illuminating Device

Figure 14:
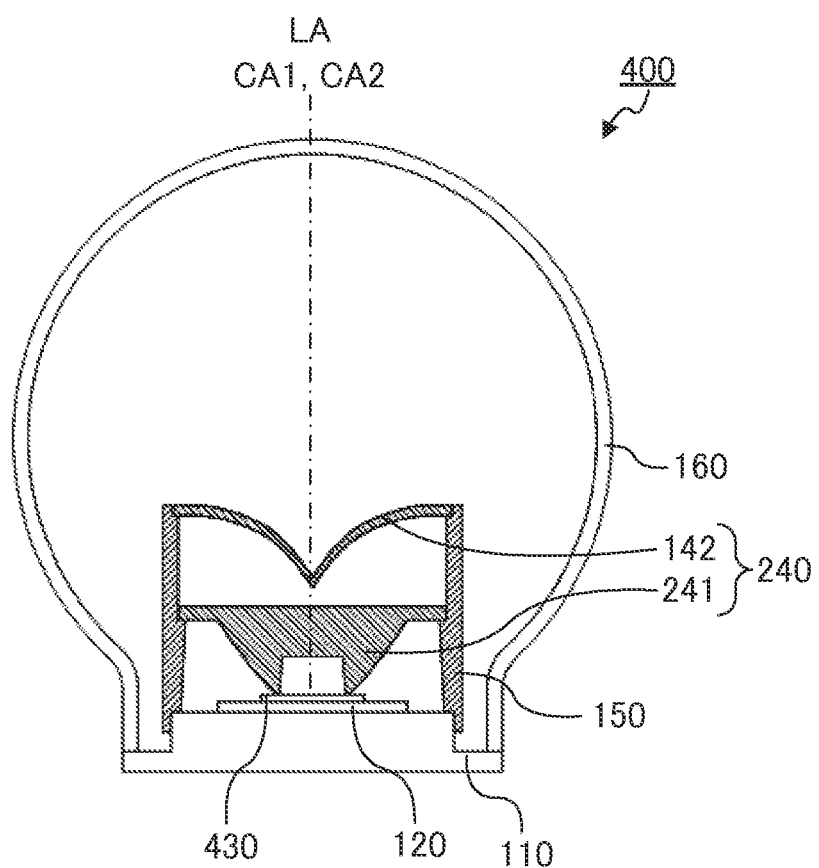
FIG. 14 is a cross-sectional view of an illuminating apparatus according to Embodiment 4.

FIG. 14 is a cross-sectional view illustrating the configuration of illuminating apparatus 400 according to Embodiment 4 of the invention. As shown in FIG. 14, illuminating apparatus 400 includes pedestal 110, substrate 120, light-emitting element 430, light flux controlling member 240, holder 150, and cover 160. Illuminating apparatus 400 according to Embodiment 4 is different from illuminating apparatus 200 according to Embodiment 2, in that the size of light-emitting element 130 is larger than the bottom portion of first light flux controlling member 241. Therefore, the same constituents as in illuminating apparatus 200 according to Embodiment 2 will be referenced by the same reference numerals and description thereof will not be repeated.

Light-emitting element 430 is a light source of illuminating apparatus 400 and is mounted on substrate 120 fixed to pedestal 110. As described above, the size of light-emitting element 430 is larger than the outer edge of bottom portion 147 of first light flux controlling member 241. Therefore, as shown in FIG. 14, the outer peripheral portion of light-emitting element 430 is opposed to total reflection surface 144, not to incidence surface 243 (concave portion) of first light flux controlling member 241.

Figure 15A:
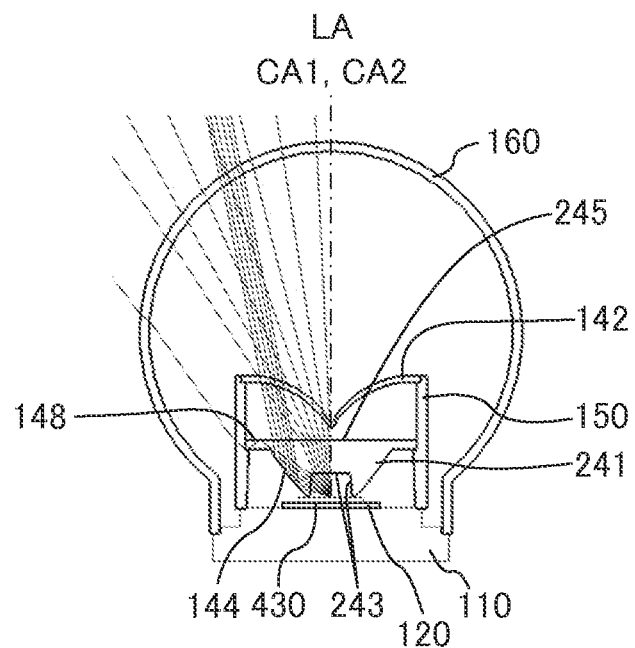
FIGS. 15A and 15B are diagrams illustrating the optical path of light from the central portion of a light-emitting element.
Figure 15B:
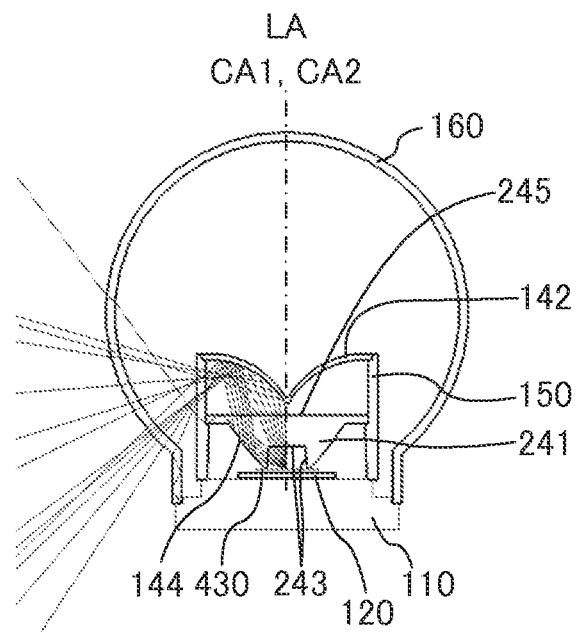
Figure 16A:
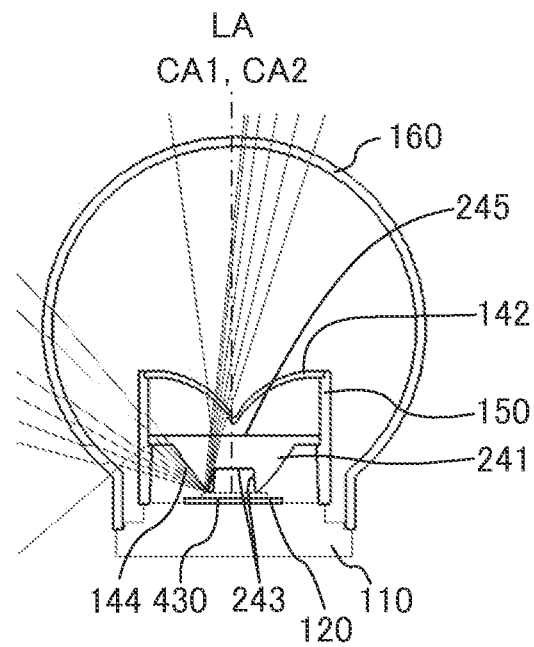
FIGS. 16A and 16B are diagrams illustrating the optical path of light from the outer peripheral portion of the light-emitting element.
Figure 16B:
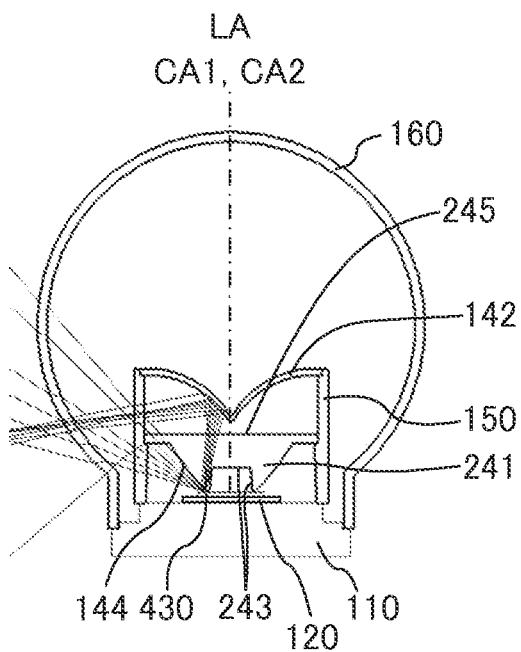

The optical path of light emitted from light-emitting element 430 in illuminating apparatus 400 according to Embodiment 4 will be described with reference to FIGS. 15A and 15B and FIGS. 16A and 16B. FIGS. 15A and 15B are diagrams illustrating the optical path of light from the central portion of light-emitting element 430. FIGS. 16A and 16B are diagrams illustrating the optical path of light from the outer peripheral portion of light-emitting element 430. FIGS. 15A and 16A are diagrams illustrating the optical path when light reaching second light flux controlling member 142 passes through second light flux controlling member 142. On the other hand, FIGS. 15B and 16B are diagrams illustrating the optical path when light reaching second light flux controlling member 142 is reflected by reflection surface 149 of second light flux controlling member 142.

As shown in FIGS. 15A and 15B, light emitted from the central portion of light-emitting element 430 is incident on first light flux controlling member 241 from incidence surface 243. A part of the light incident on first light flux controlling member 241 is reflected to second light flux controlling member 142 by total reflection surface 144 and is emitted from emission surface 245. A part of light incident on first light flux controlling member 241 is emitted to second light flux controlling member 142 from emission surface 245 without reflection. A part of light emitted from emission surface 245 of first light flux controlling member 241 passes through second light flux controlling member 142 and reaches the upper portion of cover 160 (see FIG. 15A). A part of light emitted from emission surface 245 of first light flux controlling member 241 is reflected by second light flux controlling member 142 and reaches the middle portion and the lower portion of cover 160 (see FIG. 15B).

As shown in FIGS. 16A and 16B, a part of light emitted from the outer peripheral portion of light-emitting element 430 is incident on first light flux controlling member 241 from total reflection surface 144. In this case, total reflection surface 144 serves as a refraction surface. Light incident on first light flux controlling member 241 from total reflection surface 144 is emitted to second light flux controlling member 142 from emission surface 245 without reflection. A part of light emitted from emission surface 245 of first light flux controlling member 241 passes through second light flux controlling member 142 and reaches the upper portion of cover 160 (see FIG. 16A). A part of light emitted from emission surface 245 of first light flux controlling member 241 is reflected by second light flux controlling member 142 and reaches the middle portion and the lower portion of cover 160 (see FIG. 16B). On the other hand, a part of light emitted from the outer peripheral portion of light-emitting element 430 passes through holder 150 and reaches the middle portion and the lower portion of cover 160 (see FIGS. 16A and 16B).

In this way, in illuminating apparatus 400 according to Embodiment 4, the outer peripheral portion of light-emitting element 430 is not opposed to incidence surface 243 of first light flux controlling member 241, but a part of light emitted from the outer peripheral portion of light-emitting element 430 reaches cover 160 through first light flux controlling member 241 and second light flux controlling member 142. Therefore, degradation in light distribution characteristics is suppressed which is caused by causing light emitted from the outer peripheral portion of light-emitting element 430 to directly reach cover 160.

Advantages

Illuminating apparatus 400 according to Embodiment 4 has the same advantages as illuminating apparatus 200 according to Embodiment 2.

Embodiment 5

Configuration of Illuminating Device

Figure 17A:
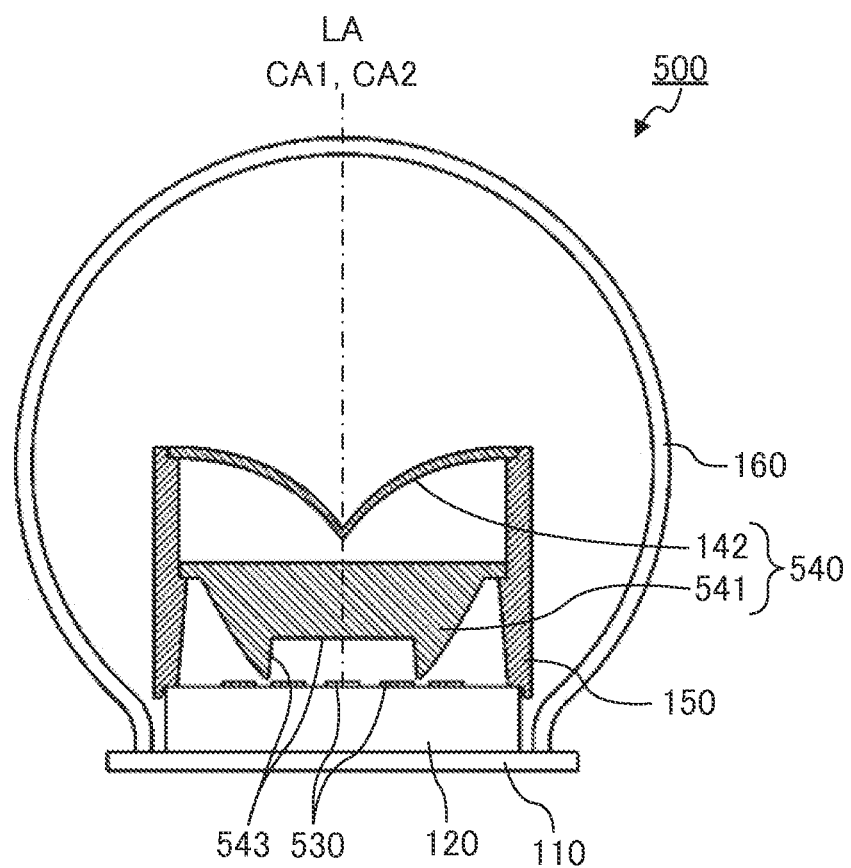
FIG. 17A is a cross-sectional view of an illuminating apparatus according to Embodiment 5.

FIG. 17A is a cross-sectional view illustrating the configuration of illuminating apparatus 500 according to Embodiment 5 of the invention. As shown in FIG. 17A, illuminating apparatus 500 includes pedestal 110, substrate 120, plural light-emitting elements 530, light flux controlling member 540, holder 150, and cover 160. Light flux controlling member 540 includes first light flux controlling member 541 and second light flux controlling member 142. Illuminating apparatus 500 according to Embodiment 5 is different from illuminating apparatus 200 according to Embodiment 2, in that plural light-emitting elements 530 are provided and the opening diameter of the concave portion of first light flux controlling member 541 is large. Therefore, the same constituents as in illuminating apparatus 200 according to Embodiment 2 will be referenced by the same reference numerals and description thereof will not be repeated.

(1) Light-Emitting Element

Figure 17B:
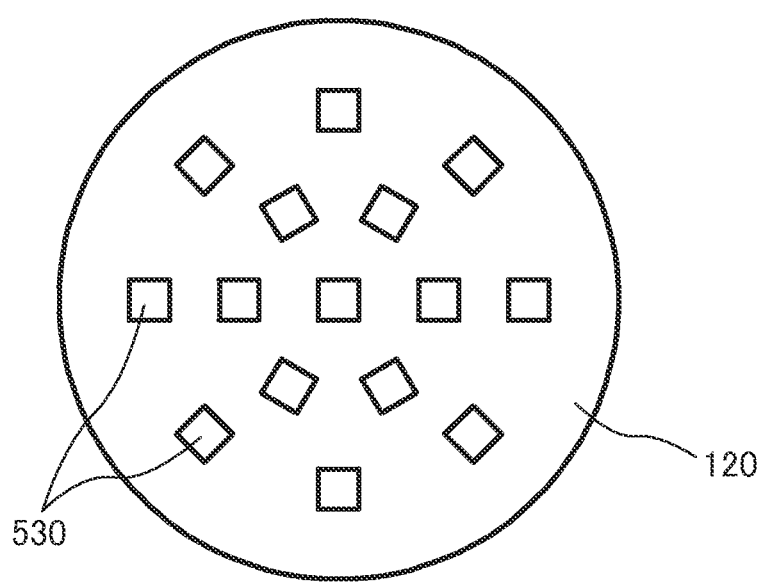
FIG. 17B is a plan view of a substrate and light-emitting elements.

Plural light-emitting elements 530 are a light source of illuminating apparatus 500 and are mounted on substrate 120 fixed to pedestal 110. FIG. 17B is a plan view of substrate 120 and light-emitting elements 530. As shown in FIG. 17B, light-emitting elements 530 are arranged on the peripheries of concentric circles. When plural light-emitting elements 530 are arranged on substrate 120 in this way, "optical axis LA of the light-emitting element" means the traveling direction of light at the center of a three-dimensional light flux from plural light-emitting elements 530. As shown in FIG. 17A, light-emitting elements 530 located on the outer portion are opposed to total reflection surface 144, not to incidence surface 543 (concave portion) of first light flux controlling member 541.

(2) Light Flux Controlling Member

Light flux controlling member 540 includes first light flux controlling member 541 and second light flux controlling member 142. Second light flux controlling member 142 is the same as that in Embodiment 1 and thus description thereof will not be repeated.

First light flux controlling member 541 includes incidence surface 543, total reflection surface 144, and emission surface 245. As described above, first light flux controlling member 541 is different from first light flux controlling member 241 in Embodiment 2, in that the opening diameter of the concave portion is large. As shown in FIG. 17A, the opening diameter of the concave portion is enlarged so that seven light-emitting elements 530 in the vicinity of the central portion out of plural light-emitting elements 530 oppose incidence surface 543.

Figure 18A:
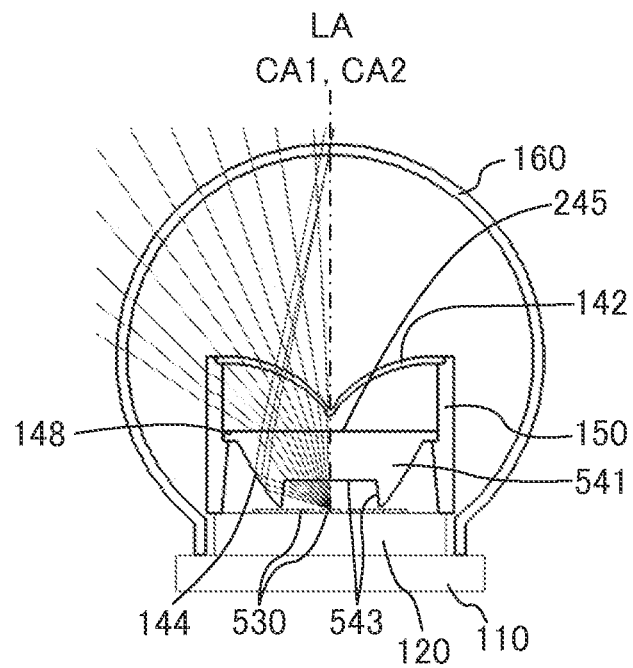
FIGS. 18A and 18B are diagrams illustrating the optical path of light from a light-emitting element located at the central portion.
Figure 18B:
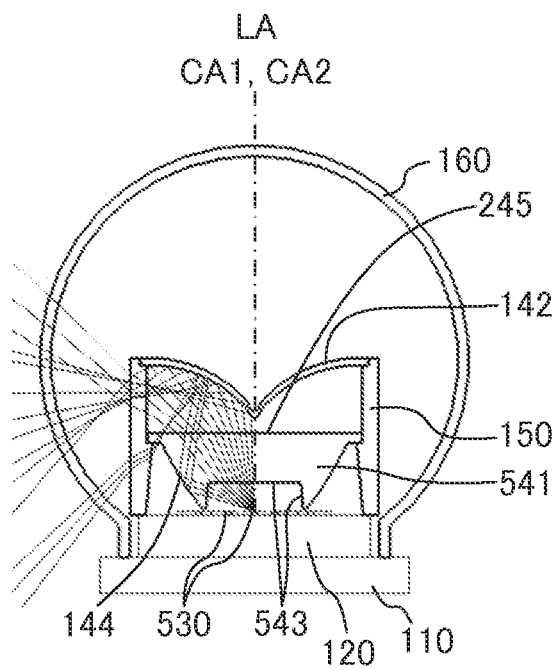
Figure 19A:
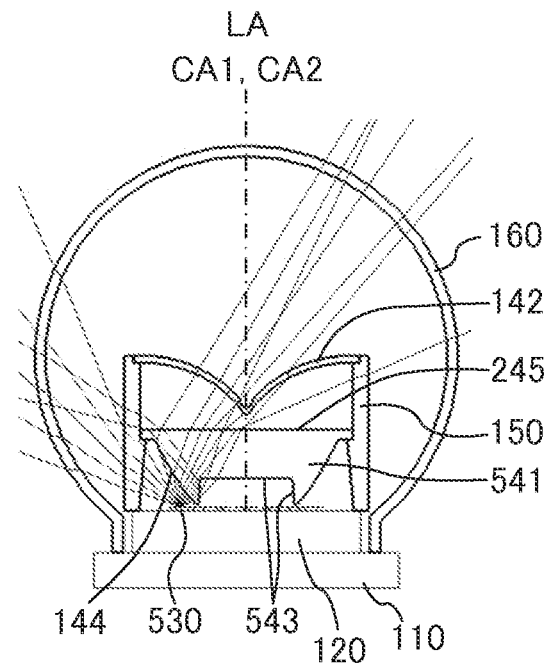
FIGS. 19A and 19B are diagrams illustrating the optical path of light from a light-emitting element located at the outer peripheral portion.
Figure 19B:
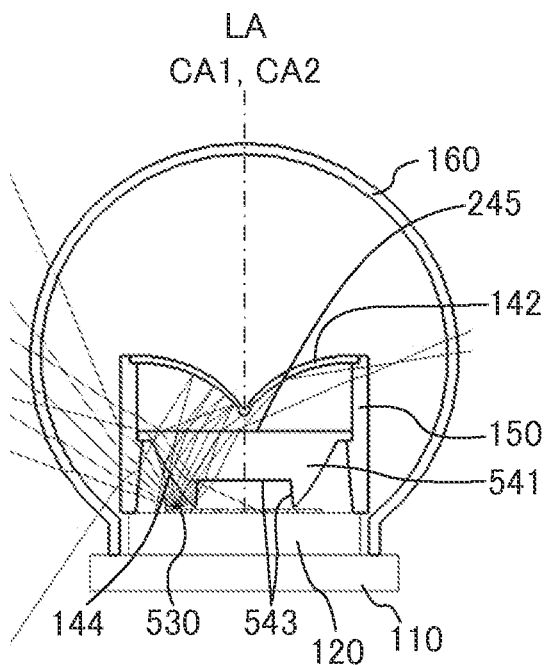

The optical path of light emitted from light-emitting elements 530 in illuminating apparatus 500 according to Embodiment 5 will be described with reference to FIGS. 18A and 18B and FIGS. 19A and 19B. FIGS. 18A and 18B are diagrams illustrating the optical path of light from light-emitting element 530 located in the central portion. FIGS. 19A and 19B are diagrams illustrating the optical path of light from light-emitting element 530 located in the outer peripheral portion. FIGS. 18A and 19A are diagrams illustrating the optical path when light reaching second light flux controlling member 142 passes through second light flux controlling member 142. On the other hand, FIGS. 18B and 19B are diagrams illustrating the optical path when light reaching second light flux controlling member 142 is reflected by reflection surface 149 of second light flux controlling member 142.

As shown in FIGS. 18A and 18B, light emitted from light-emitting element 530 located in the central portion is incident on first light flux controlling member 541 from incidence surface 543. A part of the light incident on first light flux controlling member 541 is reflected to second light flux controlling member 142 by total reflection surface 144 and is emitted from emission surface 245. Total reflection surface 144 is designed to totally reflect light emitted from the intersection of optical axis LA and light-emitting element 530 and the vicinity thereof and to direct the light to second light flux controlling member 142. A part of light incident on first light flux controlling member 541 is emitted to second light flux controlling member 142 from emission surface 245 without reflection. A part of light emitted from emission surface 245 of first light flux controlling member 541 passes through second light flux controlling member 142 and reaches the upper portion of cover 160 (see FIG. 18A). A part of light emitted from emission surface 245 of first light flux controlling member 541 is reflected by second light flux controlling member 142 and reaches the middle portion and the lower portion of cover 160 (see FIG. 18B).

As shown in FIGS. 19A and 19B, a part of light emitted from light-emitting element 530 located in the outer peripheral portion is incident on first light flux controlling member 541 from total reflection surface 144. In this case, total reflection surface 144 serves as a refraction surface. Light incident on first light flux controlling member 541 from total reflection surface 144 is emitted to second light flux controlling member 142 from emission surface 245 without reflection. A part of light emitted from emission surface 245 of first light flux controlling member 541 passes through second light flux controlling member 142 and reaches the upper portion of cover 160 (see FIG. 19A). A part of light emitted from emission surface 245 of first light flux controlling member 541 is reflected by second light flux controlling member 142 and reaches the middle portion and the lower portion of cover 160 (see FIG. 19B). On the other hand, a part of light emitted from light-emitting element 530 located in the outer peripheral portion passes through holder 150 and reaches the middle portion and the lower portion of cover 160 (see FIGS. 19A and 19B).

In this way, in illuminating apparatus 500 according to Embodiment 5, light-emitting elements 530 located in the outer peripheral portion are not opposed to incidence surface 543 of first light flux controlling member 541, but a part of light emitted from light-emitting elements 530 located in the outer peripheral portion reaches cover 160 through first light flux controlling member 541 and second light flux controlling member 142. Therefore, degradation in light distribution characteristics is suppressed which is caused by causing light emitted from light-emitting elements 530 located in the outer peripheral portion to directly reach cover 160.

Advantages

Light flux controlling member 540 and illuminating apparatus 500 according to Embodiment 5 have the same advantages as light flux controlling member 240 and illuminating apparatus 200 according to Embodiment 2.

Embodiment 6

Configuration of Illuminating Device

Figure 20:
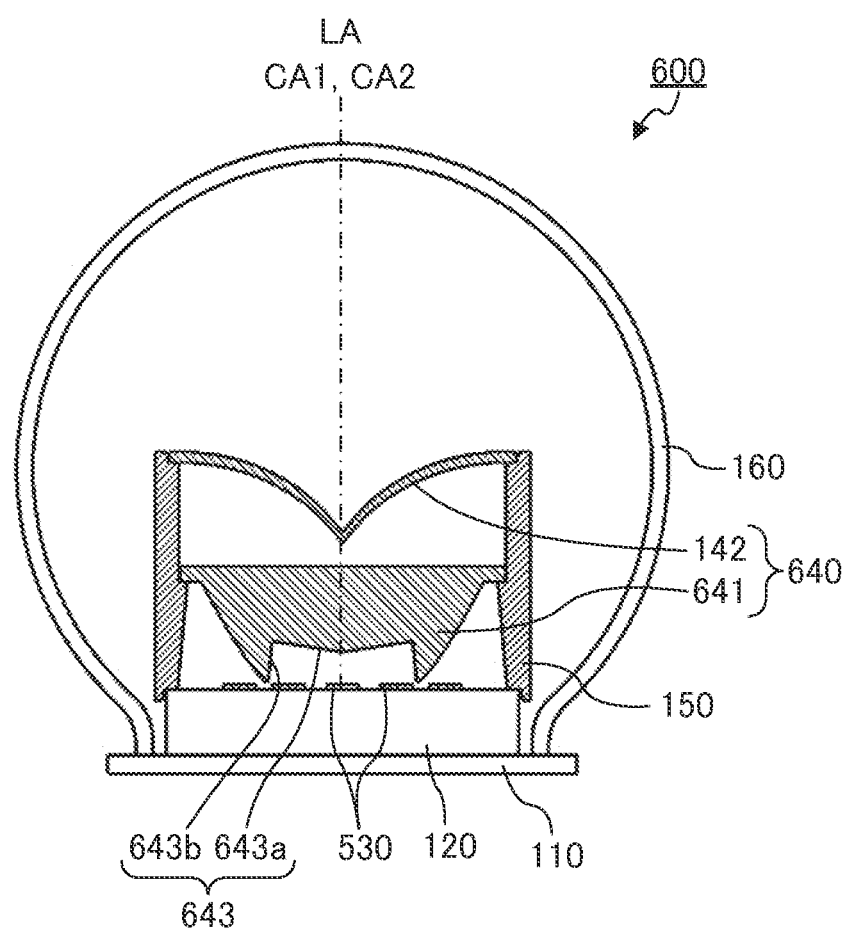
FIG. 20 is a cross-sectional view of an illuminating apparatus according to Embodiment 6.

FIG. 20 is a cross-sectional view illustrating the configuration of illuminating apparatus 600 according to Embodiment 6 of the invention. As shown in FIG. 20, illuminating apparatus 600 includes pedestal 110, substrate 120, plural light-emitting elements 530, light flux controlling member 640, holder 150, and cover 160. Light flux controlling member 640 includes first light flux controlling member 641 and second light flux controlling member 142. Illuminating apparatus 600 according to Embodiment 6 is different from illuminating apparatus 500 according to Embodiment 5, in that inner top surface 643a of incidence surface 643 of first light flux controlling member 641 has a conical shape. Therefore, the same constituents as in illuminating apparatus 500 according to Embodiment 5 will be referenced by the same reference numerals and description thereof will not be repeated.

Light flux controlling member 640 includes first light flux controlling member 641 and second light flux controlling member 142. Second light flux controlling member 142 is the same as that in Embodiment 1 and thus description thereof will not be repeated.

First light flux controlling member 641 includes incidence surface 643, total reflection surface 144, and emission surface 245. As shown in FIG. 20, incidence surface 643 includes inner top surface 643a constituting the top surface of the concave portion and inner side surface 643b constituting the side surface of the concave portion. Inner top surface 643a has a conical shape concave with respect to light-emitting elements 530. The inner diameter of inner side surface 643b gradually increases from inner top surface 643a to the opening edge so that the inner diameter of the opening edge is larger than the inner diameter of the edge of inner top surface 643a.

Figure 21A:
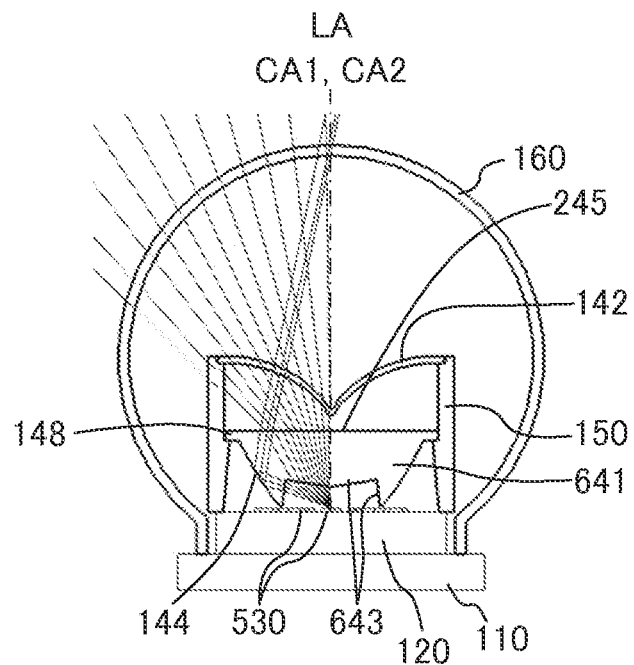
FIGS. 21A and 21B are diagrams illustrating the optical path of light from a light-emitting element located at the central portion.
Figure 21B:
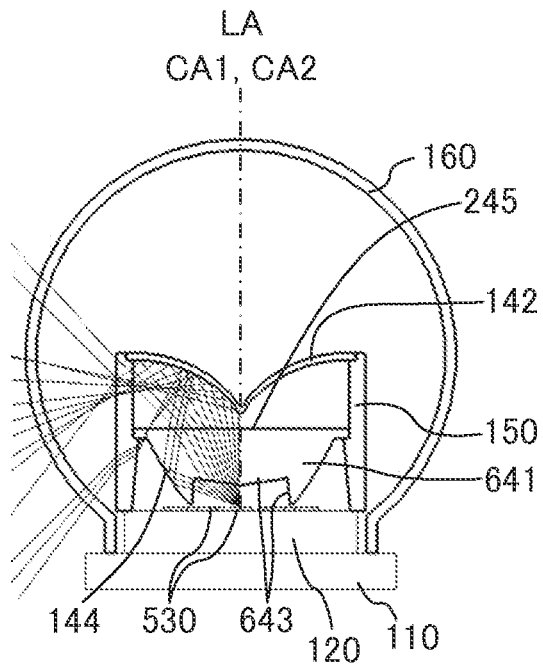
Figure 22A:
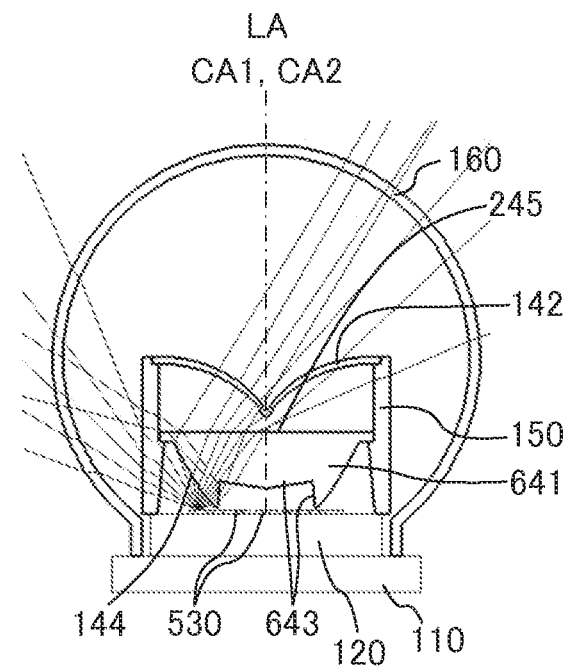
FIGS. 22A and 22B are diagrams illustrating the optical path of light from a light-emitting element located at the outer peripheral portion.
Figure 22B:
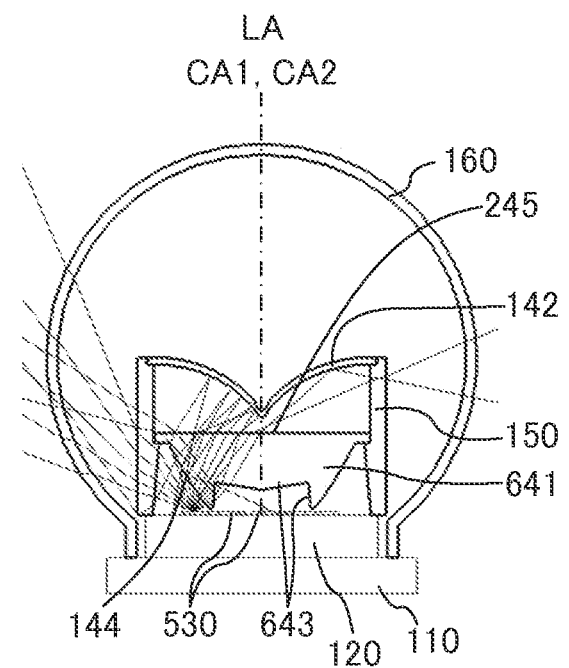

The optical path of light emitted from light-emitting elements 530 in illuminating apparatus 600 according to Embodiment 6 will be described with reference to FIGS. 21A and 21B and FIGS. 22A and 22B. FIGS. 21A and 21B are diagrams illustrating the optical path of light from light-emitting element 530 located in the central portion. FIGS. 22A and 22B are diagrams illustrating the optical path of light from light-emitting element 530 located in the outer peripheral portion. FIGS. 21A and 22A are diagrams illustrating the optical path when light reaching second light flux controlling member 142 passes through second light flux controlling member 142. On the other hand, FIGS. 21B and 22B are diagrams illustrating the optical path when light reaching second light flux controlling member 142 is reflected by reflection surface 149 of second light flux controlling member 142.

As shown in FIGS. 21A and 21B, light emitted from light-emitting element 530 located in the central portion is incident on first light flux controlling member 641 from incidence surface 643. A part of the light incident on first light flux controlling member 641 is reflected to second light flux controlling member 142 by total reflection surface 144 and is emitted from emission surface 245. A part of light incident on first light flux controlling member 641 is emitted to second light flux controlling member 142 from emission surface 245 without reflection. A part of light emitted from emission surface 245 of first light flux controlling member 641 passes through second light flux controlling member 142 and reaches the upper portion of cover 160 (see FIG. 21A). A part of light emitted from emission surface 245 of first light flux controlling member 641 is reflected by second light flux controlling member 142 and reaches the middle portion and the lower portion of cover 160 (see FIG. 21B).

In illuminating apparatus 600 according to Embodiment 6, unlike illuminating apparatus 500 according to Embodiment 5, inner top surface 543a of incidence surface 543 has a conical shape. Accordingly, light incident from inner top surface 543a is concentrated on the center of second light flux controlling member 142. Therefore, in illuminating apparatus 600 according to Embodiment 6, the amount of light reaching the vicinity of the central portion of second light flux controlling member 142 increases and the amount of light reaching the upper portion and the middle portion of cover 160 increases, compared with illuminating apparatus 500 according to Embodiment 5.

As shown in FIGS. 22A and 22B, a part of light emitted from light-emitting element 530 located in the outer peripheral portion is incident on first light flux controlling member 641 from total reflection surface 144. Light incident on first light flux controlling member 641 from total reflection surface 144 is emitted to second light flux controlling member 142 from emission surface 245 without reflection. A part of light emitted from emission surface 245 of first light flux controlling member 641 passes through second light flux controlling member 142 and reaches the upper portion of cover 160 (see FIG. 22A). A part of light emitted from emission surface 245 of first light flux controlling member 641 is reflected by second light flux controlling member 142 and reaches the middle portion and the lower portion of cover 160 (see FIG. 22B). On the other hand, a part of light emitted from light-emitting element 530 located in the outer peripheral portion passes through holder 150 and reaches the middle portion and the lower portion of cover 160 (see FIGS. 22A and 22B).

In this way, in illuminating apparatus 600 according to Embodiment 6, light-emitting elements 530 located in the outer peripheral portion are not opposed to incidence surface 643 of first light flux controlling member 641, but a part of light emitted from light-emitting elements 530 located in the outer peripheral portion reaches cover 160 through first light flux controlling member 641 and second light flux controlling member 142. Therefore, degradation in light distribution characteristics is suppressed which is caused by causing light emitted from light-emitting elements 530 located in the outer peripheral portion to directly reach cover 160.

Advantages

Light flux controlling member 640 and illuminating apparatus 600 according to Embodiment 6 have the same advantages as light flux controlling member 240 and illuminating apparatus 200 according to Embodiment 2.

Embodiment 7

Configuration of Illuminating Device

Figure 23:
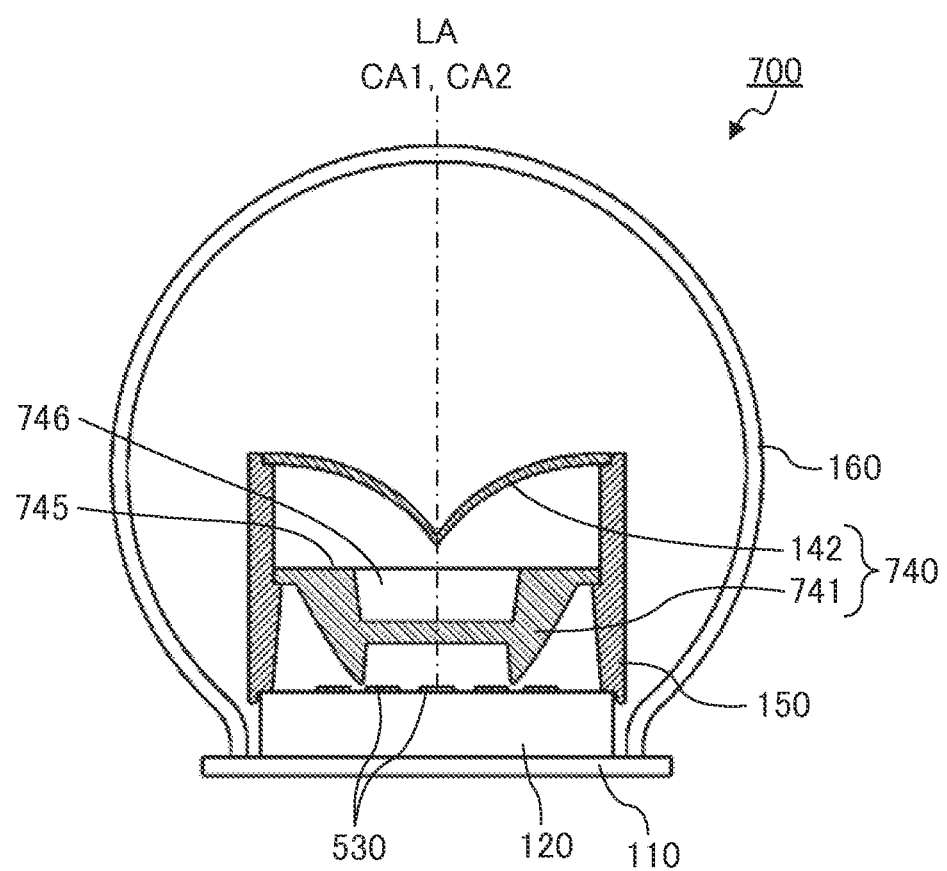
FIG. 23 is a cross-sectional view of an illuminating apparatus according to Embodiment 7.

FIG. 23 is a cross-sectional view illustrating the configuration of illuminating apparatus 700 according to Embodiment 7 of the invention. As shown in FIG. 23, illuminating apparatus 700 includes pedestal 110, substrate 120, plural light-emitting elements 530, light flux controlling member 740, holder 150, and cover 160. Light flux controlling member 740 includes first light flux controlling member 741 and second light flux controlling member 142. Illuminating apparatus 700 according to Embodiment 7 is different from illuminating apparatus 500 according to Embodiment 5, in that concave portion 746 is formed on emission surface 745 of first light flux controlling member 741. Therefore, the same constituents as in illuminating apparatus 500 according to Embodiment 5 will be referenced by the same reference numerals and description thereof will not be repeated.

Light flux controlling member 740 includes first light flux controlling member 741 and second light flux controlling member 142. Second light flux controlling member 142 is the same as that in Embodiment 1 and thus description thereof will not be repeated.

First light flux controlling member 741 includes incidence surface 543, total reflection surface 144, and emission surface 745. As shown in FIG. 23, concave portion 746 is formed on emission surface 745 of first light flux controlling member 741. Inner bottom surface of concave portion 746 also serves as emission surface 745. The inner diameter of the inner side surface gradually increases from the inner bottom surface to the opening edge so that the inner diameter of the opening edge is larger than the inner diameter of the edge of the inner bottom surface. The inner side surface may have a constant inner diameter from the edge of the inner bottom surface to the opening edge.

Figure 24A:
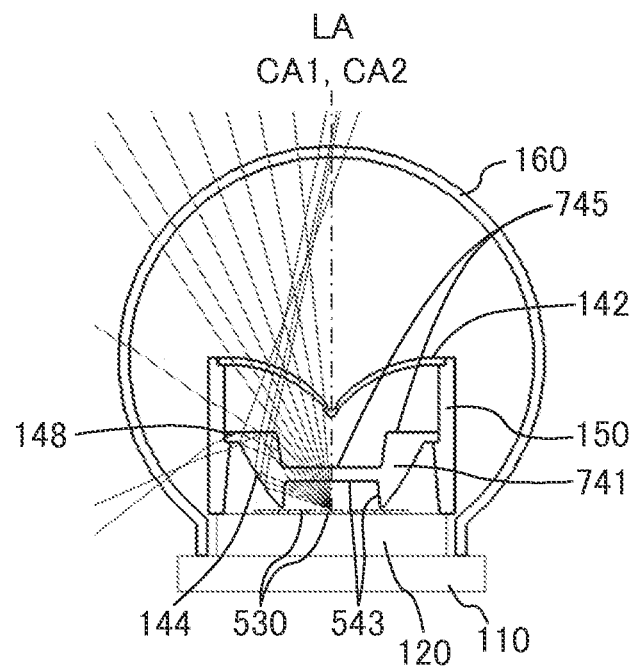
FIGS. 24A and 24B are diagrams illustrating the optical path of light from a light-emitting element located at the central portion.
Figure 24B:
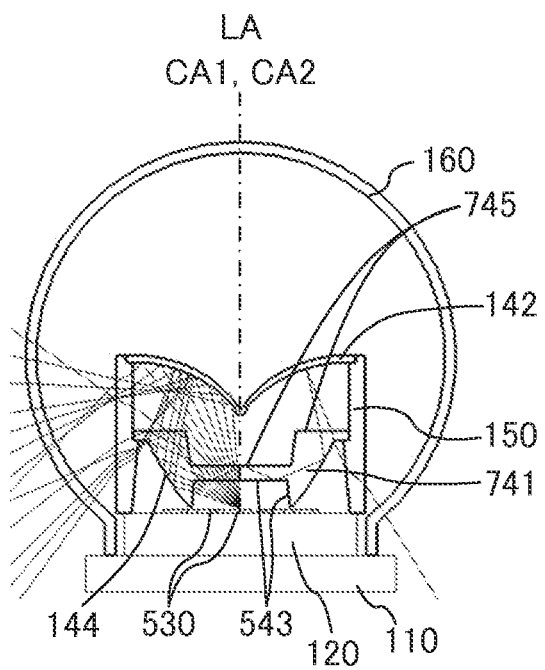
Figure 25A:
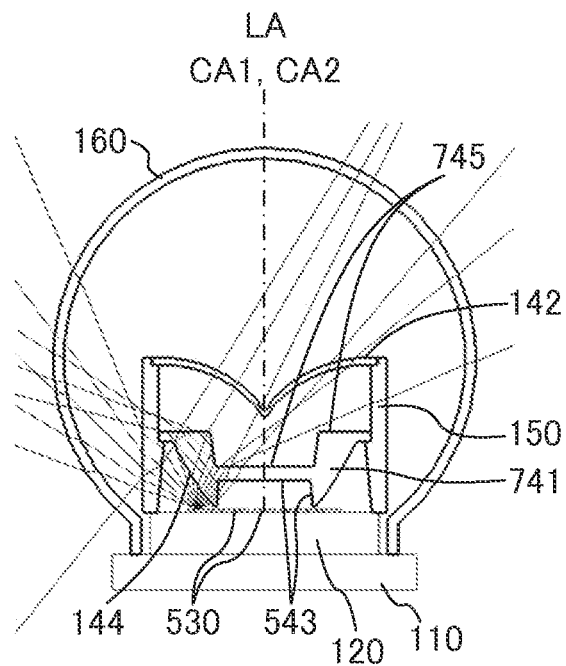
FIGS. 25A and 25B are diagrams illustrating the optical path of light from a light-emitting element located at the outer peripheral portion.
Figure 25B:
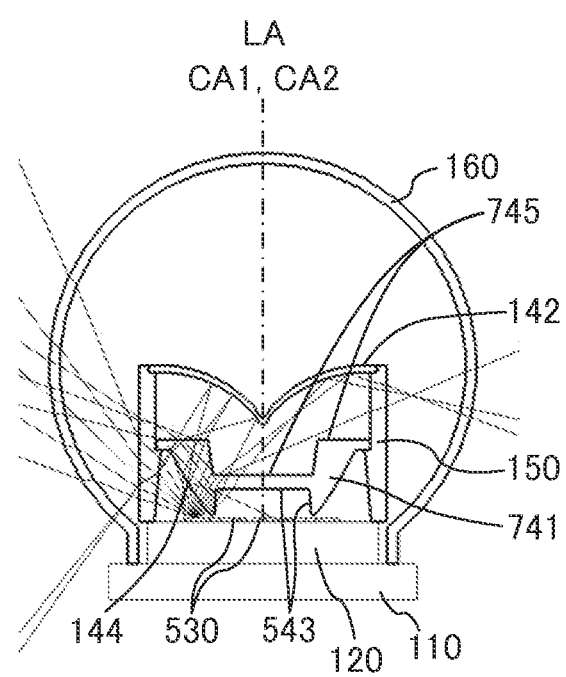

The optical path of light emitted from light-emitting elements 530 in illuminating apparatus 700 according to Embodiment 7 will be described with reference to FIGS. 24A and 24B and FIGS. 25A and 25B. FIGS. 24A and 24B are diagrams illustrating the optical path of light from light-emitting element 530 located in the central portion. FIGS. 25A and 25B are diagrams illustrating the optical path of light from light-emitting element 530 located in the outer peripheral portion. FIGS. 24A and 25A are diagrams illustrating the optical path when light reaching second light flux controlling member 142 passes through second light flux controlling member 142. On the other hand, FIGS. 24B and 25B are diagrams illustrating the optical path when light reaching second light flux controlling member 142 is reflected by reflection surface 149 of second light flux controlling member 142.

As shown in FIGS. 24A and 24B, light emitted from light-emitting element 530 located in the central portion is incident on first light flux controlling member 741 from incidence surface 543. A part of the light incident on first light flux controlling member 741 is reflected to second light flux controlling member 142 by total reflection surface 144 and is emitted from emission surface 745. A part of light incident on first light flux controlling member 741 is emitted to second light flux controlling member 142 from emission surface 745 without reflection. A part of light emitted from emission surface 745 of first light flux controlling member 741 passes through second light flux controlling member 142 and reaches the upper portion of cover 160 (see FIG. 24A). A part of light emitted from emission surface 745 of first light flux controlling member 741 is reflected by second light flux controlling member 142 and reaches the middle portion and the lower portion of cover 160 (see FIG. 24B).

As shown in FIGS. 25A and 25B, a part of light emitted from light-emitting element 530 located in the outer peripheral portion is incident on first light flux controlling member 741 from total reflection surface 144. Light incident on first light flux controlling member 741 from total reflection surface 144 is emitted to second light flux controlling member 142 from emission surface 745 without reflection. A part of light emitted from emission surface 745 of first light flux controlling member 741 passes through second light flux controlling member 142 and reaches the upper portion of cover 160 (see FIG. 25A). A part of light emitted from emission surface 745 of first light flux controlling member 741 is reflected by second light flux controlling member 142 and reaches the middle portion and the lower portion of cover 160 (see FIG. 25B). On the other hand, a part of light emitted from light-emitting element 530 located in the outer peripheral portion passes through holder 150 and reaches the middle portion and the lower portion of cover 160 (see FIGS. 25A and 25B).

In this way, in illuminating apparatus 700 according to Embodiment 7, light-emitting elements 530 located in the outer peripheral portion are not opposed to incidence surface 543 of first light flux controlling member 741, but a part of light emitted from light-emitting elements 530 located in the outer peripheral portion reaches cover 160 through first light flux controlling member 741 and second light flux controlling member 142. Therefore, degradation in light distribution characteristics is suppressed which is caused by causing light emitted from light-emitting elements 530 located in the outer peripheral portion to directly reach cover 160.

Advantages

Light flux controlling member 740 and illuminating apparatus 700 according to Embodiment 7 have the same advantages as light flux controlling member 240 and illuminating apparatus 200 according to Embodiment 2. Since light flux controlling member 740 according to Embodiment 7 includes concave portion 746, it is possible to achieve reduction in cost of materials and improvement in moldability, compared with light flux controlling member 240 according to Embodiment 2.

Embodiment 8

Configuration of Illuminating Device

Figure 26:
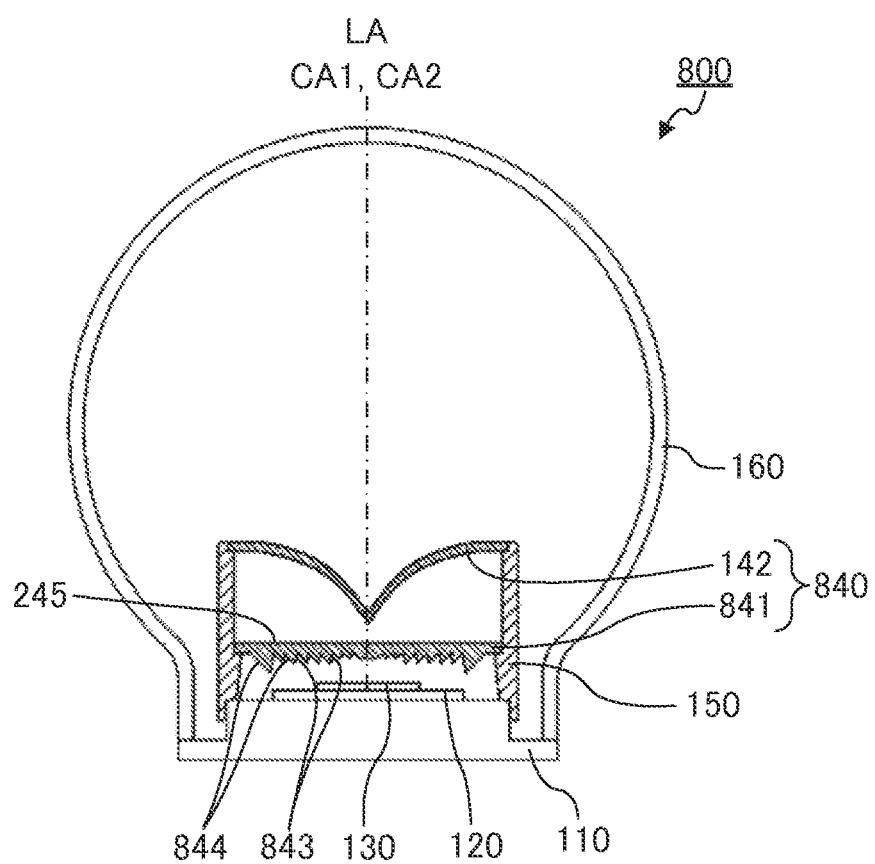
FIG. 26 is a cross-sectional view of an illuminating apparatus according to Embodiment 8.

FIG. 26 is a cross-sectional view illustrating the configuration of illuminating apparatus 800 according to Embodiment 8 of the invention. As shown in FIG. 26, illuminating apparatus 800 includes pedestal 110, substrate 120, light-emitting element 130, light flux controlling member 840, holder 150, and cover 160. Light flux controlling member 840 includes first light flux controlling member 841 and second light flux controlling member 142. Illuminating apparatus 800 according to Embodiment 8 is different from illuminating apparatus 200 according to Embodiment 2, in that first light flux controlling member 841 is a Fresnel lens. Therefore, the same constituents as in illuminating apparatus 200 according to Embodiment 2 will be referenced by the same reference numerals and description thereof will not be repeated.

Light flux controlling member 840 includes first light flux controlling member 841 and second light flux controlling member 142. Second light flux controlling member 142 is the same as that in Embodiment 1 and thus description thereof will not be repeated.

First light flux controlling member 841 is a Fresnel lens having a total reflection function and includes plural ring-like protrusions arranged concentrically on the side opposed to light-emitting element 130. Each of the plural protrusions includes incidence surface 843 on which light emitted from light-emitting element 130 is incident and total reflection surface 844 that reflects light incident from incidence surface 843 toward second light flux controlling member 142. Incidence surface 843 is located in the inside of the corresponding protrusion (the side facing central axis CA1) and total reflection surface 844 is located in the outside of the protrusion. First light flux controlling member 841 includes planar emission surface 245 on the side facing second light flux controlling member 142. That is, first light flux controlling member 841 includes plural incidence surfaces 843, plural total reflection surfaces 844, and emission surface 245.

Figure 27A:
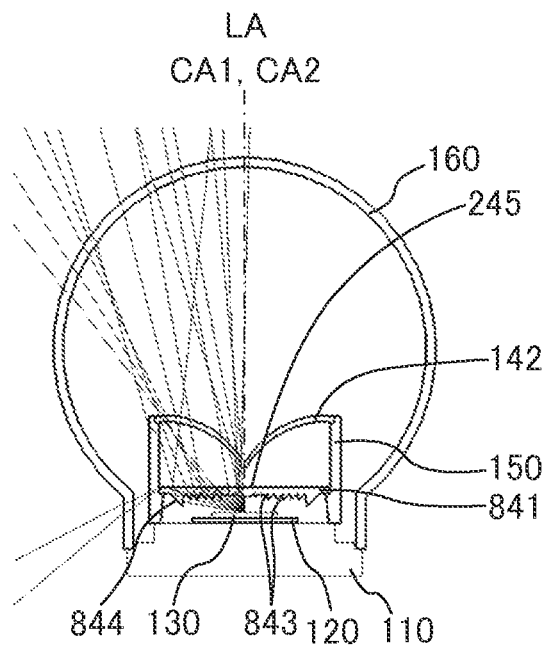
FIGS. 27A and 27B are diagrams illustrating the optical path of light from a light-emitting element located at the central portion.
Figure 27B:
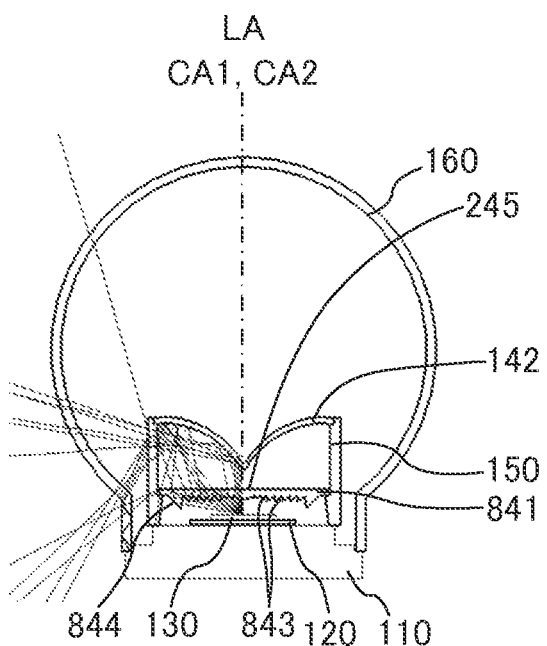
Figure 28A:
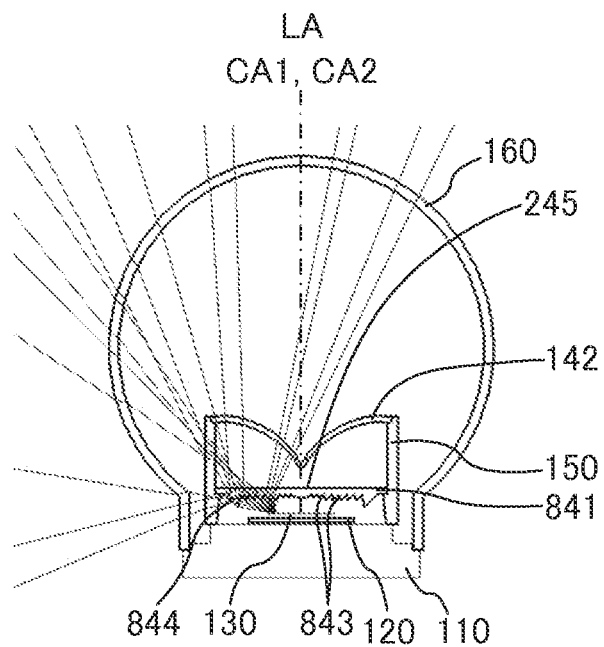
FIGS. 28A and 28B are diagrams illustrating the optical path of light from a light-emitting element located at the outer peripheral portion.
Figure 28B:
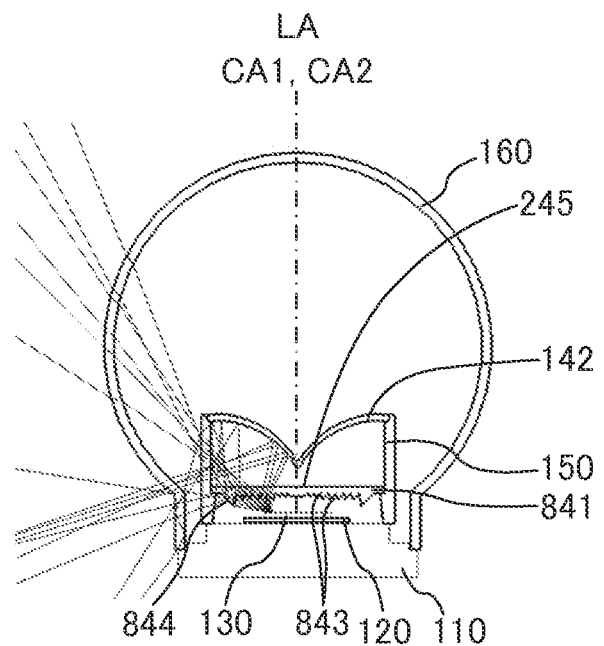

The optical path of light emitted from light-emitting element 130 in illuminating apparatus 800 according to Embodiment 8 will be described with reference to FIGS. 27A and 27B and FIGS. 28A and 28B. FIGS. 27A and 27B are diagrams illustrating the optical path of light from the central portion of light-emitting element 130. FIGS. 28A and 28B are diagrams illustrating the optical path of light from the outer peripheral portion of light-emitting element 130. FIGS. 27A and 28A are diagrams illustrating the optical path when light reaching second light flux controlling member 142 passes through second light flux controlling member 142. On the other hand, FIGS. 27B and 28B are diagrams illustrating the optical path when light reaching second light flux controlling member 142 is reflected by reflection surface 149 of second light flux controlling member 142.

As shown in FIGS. 27A and 27B, light emitted from the central portion of light-emitting element 130 is incident on first light flux controlling member 841 from incidence surfaces 843 of the ring-like protrusions. A part of the light incident on first light flux controlling member 841 is reflected to second light flux controlling member 142 by corresponding total reflection surfaces 844 and is emitted from emission surface 245. A part of light incident on first light flux controlling member 841 is emitted to second light flux controlling member 142 from emission surface 245 without reflection. A part of light emitted from emission surface 245 of first light flux controlling member 841 passes through second light flux controlling member 142 and reaches the upper portion of cover 160 (see FIG. 27A). A part of light emitted from emission surface 245 of first light flux controlling member 841 is reflected by second light flux controlling member 142 and reaches the middle portion and the lower portion of cover 160 (see FIG. 27B).

As shown in FIGS. 28A and 28B, a part of light emitted from the outer peripheral portion of light-emitting element 130 is incident on first light flux controlling member 841 from incidence surfaces 843 or total reflection surfaces 844 of the ring-like protrusions. A part of light incident from incidence surfaces 843 is totally reflected to second light flux controlling member 142 by corresponding total reflection surfaces 844 and is emitted from emission surface 245. A part of light incident on first light flux controlling member 841 is emitted from emission surface 245 or total reflection surfaces 844 to second light flux controlling member 142 or holder 150. A part of light emitted from emission surface 245 of first light flux controlling member 841 passes through second light flux controlling member 142 or holder 150 and reaches the upper portion and the middle of cover 160 (see FIG. 28A). A part of light emitted from emission surface 245 of first light flux controlling member 841 is reflected by second light flux controlling member 142 and reaches the middle portion and the lower portion of cover 160 (see FIG. 28B).

Advantages

Light flux controlling member 840 and illuminating apparatus 800 according to Embodiment 8 have the same advantages as light flux controlling member 240 and illuminating apparatus 200 according to Embodiment 2. Since light flux controlling member 840 according to Embodiment 8 is reduced in thickness, it is possible to achieve reduction in cost of materials and improvement in moldability, compared with light flux controlling member 240 according to Embodiment 2.

INDUSTRIAL APPLICABILITY

The illuminating apparatus according to the invention can be used instead of an incandescent lamp and thus can be widely applied to various illumination instruments such as a chandelier or an indirect illuminating apparatus.

REFERENCE SIGNS LIST 100, 200, 300, 400, 500, 600, 700, 800 Illuminating apparatus
110 Pedestal
120 Substrate
130, 430, 530 Light-emitting element
140, 240, 540, 640, 740, 840 Light flux controlling member
141, 241, 541, 641, 741, 841 First light flux controlling member
142 Second light flux controlling member
143, 243, 543, 643, 843 Incidence surface
144, 844 Total reflection surface
145, 245, 745 Emission surface
146 Through-hole
147 Bottom portion
148 Flange
149 Reflection surface
150, 350 Holder
151 Leg portion
152 First stepped portion
153 Second stepped portion
160 Cover
243a, 643a Inner top surface
243b, 643b Inner side surface
351 Convex portion
746 Concave portion
CA1 Central axis of first light flux controlling member
CA2 Central axis of second light flux controlling member
LA Optical axis

The invention claimed is:
1. An illuminating apparatus comprising:
one or more light-emitting elements;
a first light flux controlling member on which a part of light emitted from the one or more light-emitting elements is incident, that controls the incident light to have a predetermined light distribution characteristic, and that emits the controlled light;
a second light flux controlling member that reflects at least a part of light emitted from the first light flux controlling member and that transmits the other parts of light; and
a holder that positions the first light flux controlling member and the second light flux controlling member with respect to the one or more light-emitting elements, and that transmits light from the one or more light-emitting elements and the second light flux controlling member,
wherein the first light flux controlling member includes an incidence surface on which a part of light emitted from the one or more light-emitting elements is incident, a total reflection surface that reflects a part of light incident on the incidence surface toward the second light flux controlling member, and an emission surface that emits a part of light incident on the incidence surface and light reflected by the total reflection surface,
wherein the first light flux controlling member further narrows the light distribution of light incident on the inci- dence surface toward the second light flux controlling member by the total reflection surface, wherein the second light flux controlling member includes a reflection surface that opposes the first light flux controlling member and that reflects a part of light emitted from the first light flux controlling member, wherein the reflection surface is a rotational symmetric surface with the optical axis of the one or more light-emitting elements as a rotation axis and is formed so that a generating line of the rotational symmetric surface is a curved line concave with respect to the first light flux controlling member, wherein the outer peripheral portion of the reflection surface is formed at a position farther from the light-emitting element in the direction of the optical axis of the light-emitting element than the position of the center of the reflection surface, and wherein a part of light emitted from the one or more light-emitting elements is incident on and passes through the holder without passing through the first light flux controlling member.

2. The illuminating apparatus according to claim 1, wherein:

the second light flux controlling member includes a transmission portion that transmits a part of the light.

3. The illuminating apparatus according to claim 2, wherein:

the transmission portion is a through-hole or a concave portion.

4. The illuminating apparatus according to claim 1, wherein:

light which is a part of light emitted from the one or more light-emitting elements, the light including light traveling at small angles with respect to the optical axis including light traveling along the optical axis reaches the second light flux controlling member through a through-hole formed in the first light flux controlling member.

5. The illuminating apparatus according to claim 1, wherein:

light emitted from the one or more light-emitting elements reaches the second light flux controlling member through the first light flux controlling member.

6. The illuminating apparatus according to claim 1, wherein:

a transflective film that reflects a part of light emitted from the first light flux controlling member and transmits a part thereof is formed in the reflection surface.

7. The illuminating apparatus according to claim 1, wherein:

the second light flux controlling member is formed of a material reflecting a part of the light and transmitting a part thereof.

8. The illuminating apparatus according to claim 1 further comprising a cover that diffuses and transmits reflected light and transmitted light from the second light flux controlling member and transmitted light from the holder.

* * * * *